(12) United States Patent
Kawaguchi et al.

(10) Patent No.: US 10,296,429 B2
(45) Date of Patent: May 21, 2019

(54) STORAGE DEVICE

(71) Applicant: HITACHI, LTD., Tokyo (JP)

(72) Inventors: Tomohiro Kawaguchi, Tokyo (JP); Norio Simozono, Tokyo (JP); Hideo Saito, Tokyo (JP); Makio Mizuno, Tokyo (JP)

(73) Assignee: HITACHI, LTD., Tokyo (JP)

( * ) Notice: Subject to any disclaimer, the term of this patent is extended or adjusted under 35 U.S.C. 154(b) by 320 days.

(21) Appl. No.: 15/126,428

(22) PCT Filed: Jul. 25, 2014

(86) PCT No.: PCT/JP2014/069721
§ 371 (c)(1),
(2) Date: Sep. 15, 2016

(87) PCT Pub. No.: WO2016/013116
PCT Pub. Date: Jan. 28, 2016

(65) Prior Publication Data
US 2017/0083417 A1    Mar. 23, 2017

(51) Int. Cl.
*G06F 11/00*  (2006.01)
*G06F 11/20*  (2006.01)
(Continued)

(52) U.S. Cl.
CPC .......... *G06F 11/2094* (2013.01); *G06F 3/065* (2013.01); *G06F 3/0619* (2013.01);
(Continued)

(58) Field of Classification Search
CPC ............... G06F 11/2092; G06F 11/201; G06F 11/1076; G06F 11/006; G06F 3/0613; G06F 3/0635; G06F 3/0689; G06F 2003/0692
See application file for complete search history.

(56) References Cited

U.S. PATENT DOCUMENTS

| | | | | | |
|---|---|---|---|---|---|
| 5,615,329 | A | * | 3/1997 | Kern | G06F 11/2064 714/6.12 |
| 5,675,723 | A | * | 10/1997 | Ekrot | G06F 11/2033 714/17 |
| 5,768,623 | A | * | 6/1998 | Judd | G06F 11/2092 710/17 |
| 5,999,930 | A | * | 12/1999 | Wolff | G06F 9/52 |

(Continued)

FOREIGN PATENT DOCUMENTS

| | | |
|---|---|---|
| JP | 2005-018161 A | 1/2005 |
| JP | 2006-285808 A | 10/2006 |
| JP | 2007-207219 A | 8/2007 |

*Primary Examiner* — Bryce P Bonzo
*Assistant Examiner* — Jeison C Arcos
(74) *Attorney, Agent, or Firm* — Volpe and Koenig, P.C.

(57) ABSTRACT

A storage subsystem comprises one or more volumes, and multiple nodes having multiple control packages interconnected via an intra-node communication path, wherein the control packages of different nodes are interconnected via an inter-node communication path having a lower transmission path capacity than the intra-node communication path. When the host computer accesses a volume, access is enabled via any of at least two or more control packages out of the multiple control packages, and the priority for issuing access requests to the relevant volume is determined in each of the control packages. When the storage subsystem detects failure, it changes the priorities determined for the control packages according to the failure occurrence portion, and notifies the same to the host computer. The host computer determines the control package being the issue destination of the access request based on the notified priority.

11 Claims, 24 Drawing Sheets

(51) Int. Cl.
  *G06F 13/00* (2006.01)
  *G06F 13/10* (2006.01)
  *G06F 3/06* (2006.01)

(52) U.S. Cl.
  CPC ............ *G06F 3/0683* (2013.01); *G06F 13/00* (2013.01); *G06F 13/10* (2013.01); *G06F 2201/805* (2013.01)

(56) References Cited

U.S. PATENT DOCUMENTS

| | | | | |
|---|---|---|---|---|
| 6,343,324 | B1* | 1/2002 | Hubis | G06F 3/0622 709/229 |
| 6,601,187 | B1* | 7/2003 | Sicola | G06F 11/2071 711/162 |
| 6,785,750 | B1* | 8/2004 | Odenwald | G06F 13/102 709/217 |
| 6,952,792 | B2* | 10/2005 | Emberty | H04L 1/22 714/4.11 |
| 7,146,448 | B2* | 12/2006 | Davies | G06F 11/2005 710/302 |
| 7,290,168 | B1* | 10/2007 | DeKoning | G06F 11/201 714/5.11 |
| 7,302,539 | B2* | 11/2007 | Korgaonkar | G06F 3/0605 711/112 |
| 8,028,192 | B1* | 9/2011 | Kekre | G06F 11/1662 714/13 |
| 8,060,775 | B1* | 11/2011 | Sharma | G06F 11/2092 714/4.2 |
| 2001/0016919 | A1* | 8/2001 | Tanaka | G06F 11/2092 714/6.3 |
| 2002/0152355 | A1* | 10/2002 | Otterness | G06F 3/0617 711/114 |
| 2003/0033553 | A1* | 2/2003 | Liu | G06F 11/1492 714/1 |
| 2004/0107315 | A1* | 6/2004 | Watanabe | G06F 11/1451 711/114 |
| 2005/0102557 | A1* | 5/2005 | Davies | G06F 11/2005 714/11 |
| 2006/0224854 | A1* | 10/2006 | Nakamura | G06F 3/061 711/173 |
| 2007/0079063 | A1* | 4/2007 | Mizuno | G06F 3/0625 711/112 |
| 2007/0180314 | A1* | 8/2007 | Kawashima | G06F 11/2023 714/15 |
| 2008/0005514 | A1* | 1/2008 | Kurokawa | G06F 3/0607 711/163 |
| 2008/0005614 | A1* | 1/2008 | Lubbers | G06F 11/2092 714/11 |
| 2008/0086618 | A1* | 4/2008 | Qi | G06F 3/0611 711/170 |
| 2008/0155322 | A1* | 6/2008 | Brundidge | G06F 11/1433 714/21 |
| 2009/0158124 | A1* | 6/2009 | Kawai | G06F 3/0614 714/763 |
| 2009/0204743 | A1* | 8/2009 | Inoue | G06F 11/201 711/100 |
| 2009/0307419 | A1* | 12/2009 | Nakamura | G06F 3/061 711/113 |
| 2010/0106990 | A1* | 4/2010 | Kalman | G06F 1/3221 713/323 |
| 2010/0262772 | A1* | 10/2010 | Mazina | G06F 3/0613 711/114 |
| 2011/0154165 | A1* | 6/2011 | Primadani | G06F 11/10 714/799 |
| 2012/0254657 | A1 | 10/2012 | Kodaira | |
| 2013/0067569 | A1* | 3/2013 | Rizzo | G06F 13/12 726/21 |
| 2013/0198562 | A1* | 8/2013 | Anthonisamy | G06F 11/2005 714/6.21 |
| 2014/0188957 | A1* | 7/2014 | Hosoi | G06F 17/30067 707/829 |
| 2016/0179637 | A1* | 6/2016 | Winokur | G06F 11/2005 714/5.1 |

* cited by examiner

| PACKAGE ID 131-1 | NODE ID 131-2 | STATE 131-3 |
|---|---|---|
| 0 | 0 | NORMAL |
| 1 | 0 | NORMAL |
| 2 | 1 | NORMAL |
| 3 | 1 | NORMAL |
| 4 | 2 | NOT INSTALLED |
| 5 | 2 | NOT INSTALLED |
| 6 | 3 | NORMAL |
| 7 | 3 | BLOCKADE |

| VOLUME ID 132-1 | STATE 132-2 | RAID CONFIGURATION 132-3 | DRIVE ID 132-4 | OWNER ID 132-5 | SUB-OWNER ID 132-6 | NON-OPTIMAL PATH I/O FREQUENCY 132-7 |
|---|---|---|---|---|---|---|
| 0 | STEADY | RAID1 (2D+2P) | 0,1,2,3 | 0 | 1 | 4 |
| 1 | STEADY | RAID1 (2D+2P) | 4,5,6,7 | 0 | 1 | 0 |
| 2 | STEADY | RAID5 (3D+1P) | 8,9,10,11 | 1 | 0 | 6624 |
| 3 | NOT DEFINED | n/a | n/a | n/a | n/a | 0 |
| 4 | STEADY | RAID5 (7D+1P) | 32,33,…,39 | 2 | 3 | 78656 |
| 5 | CHANGE ONGOING | RAID5 (7D+1P) | 40,41,…,47 | 3 | 2 | 65 |
| 6 | STEADY | RAID6 (14D+2P) | 64,65,…,79 | 2 | 3 | 5 |
| 7 | STEADY | RAID6 (14D+2P) | 80,81,…,95 | 3 | 2 | 3 |

| CACHE ADDRESS 133-1 | STATE 133-2 | VOLUME ID 133-3 | LBA 133-4 |
|---|---|---|---|
| 0 | Clean | 0 | 45 |
| 1 | Clean | 0 | 668 |
| 2 | Free | n/a | n/a |
| 3 | Dirty | 1 | 2435 |
| 4 | Dirty | 0 | 5656 |
| 5 | Clean | 4 | 7866 |
| 6 | Dirty | 1 | 15672 |
| 7 | Free | 2 | 98 |

Fig.9

| VOLUME ID 135-0 | PORT GROUP Active/opt 135-11 | PORT Active/opt 135-12 | PORT GROUP Active/ nonopt 135-21 | PORT Active/ nonopt 135-22 | PORT GROUP Standby 135-31 | PORT Standby 135-32 | PORT GROUP Offline 135-41 | PORT offline 135-42 |
|---|---|---|---|---|---|---|---|---|
| 0 | 0 | 1 | 1 | 2 | 2, 3 | 3, 4 | n/a | n/a |
| 1 | 0 | 1 | 1 | 2 | 2, 3 | 3, 4 | n/a | n/a |
| 2 | 1 | 2 | 0 | 1 | 2, 3 | 3, 4 | n/a | n/a |
| 3 | n/a | n/a | n/a | n/a | n/a | n/a | n/a | n/a |
| 4 | 2 | 3 | 3 | 4 | 0, 1 | 1, 2 | n/a | n/a |
| ... | | | | | ... | ... | | ... |

Fig.15

FORMAT OF RESPONSE INFORMATION

| Bit<br>Byte | 7 | 6 | 5 | 4 | 3 | 2 | 1 | 0 | |
|---|---|---|---|---|---|---|---|---|---|
| 0<br>...<br>3 | DATA LENGTH ||||||||  ⎱ F142-0 |
| 4 | RESERV<br>ATION | FORMAT TYPE(001b) ||| RESERVATION |||| |
| 5 | IMPLICIT TRANSITION TIME |||||||| |
| 6 | RESERVATION |||||||| |
| 7 | |||||||| |
| 8<br>... | TARGET PORT GROUP DESCRIPTOR (1) ||||||||  ⎱ F142-1a |
| ...<br>n | TARGET PORT GROUP DESCRIPTOR (FINAL) ||||||||  ⎱ F142-1n |

Fig. 19

| FAILURE PACKAGE | ORIGINAL ATTRIBUTE \ NEW ATTRIBUTE | OWNER | SUB-OWNER | OTHERS |
|---|---|---|---|---|
| NONE | OWNER | •NOP | •FREE CLEAN DATA | •DESTAGE<br>•FREE DATA |
| | SUB-OWNER | •NOP | •NOP | •FREE DATA |
| | OTHERS | •NOP | •NOP | •NOP |
| OWNER | OWNER | •n/a | •n/a | •n/a |
| | SUB-OWNER | •DESTAGE | •DESTAGE<br>•FREE (CLEAN) DATA | •DESTAGE<br>•FREE DATA |
| | OTHERS | •NOP | •NOP | •NOP |
| SUB-OWNER | OWNER | •DESTAGE | •DESTAGE<br>•FREE (CLEAN) DATA | •DESTAGE<br>•FREE DATA |
| | SUB-OWNER | •n/a | •n/a | •n/a |
| | OTHERS | •NOP | •NOP | •NOP |

| FAILURE PACKAGE | NEW ATTRI-BUTE ORIGINAL ATTRI-BUTE | OWNER | SUB-OWNER | OTHERS |
|---|---|---|---|---|
| NONE | OWNER | •NOP<br><br>144-3-1' | •COPY CLEAN DATA TO NEW OWNER<br>•FREE CLEAN DATA | •COPY ALL DATA TO NEW OWNER<br>•FREE ALL DATA |
|  | SUB-OWNER | •NOP | •NOP | •COPY DIRTY DATA TO NEW SUB-OWNER<br>•FREE ALL DATA |
|  | OTHERS | •NOP | •NOP | •NOP |
| OWNER | OWNER | •n/a | •n/a | •n/a |
|  | SUB-OWNER<br><br>144-3-2' | •COPY DIRTY DATA TO NEW SUB-OWNER | •COPY DIRTY DATA TO NEW OWNER | •COPY DIRTY DATA TO NEW OWNER - NEW SUB-OWNER<br>•FREE ALL DATA |
|  | OTHERS | •NOP | •NOP | •NOP |
| SUB-OWNER | OWNER | •COPY DIRTY DATA TO NEW SUB-OWNER | •COPY ALL DATA TO NEW OWNER<br>•FREE CLEAN DATA | •COPY ALL DATA TO NEW OWNER<br>•COPY DIRTY DATA TO NEW SUB-OWNER<br>•FREE ALL DATA |
|  | SUB-OWNER | •n/a | •n/a | •n/a |
|  | OTHERS | •NOP | •NOP | •NOP |

STORAGE DEVICE

TECHNICAL FIELD

The present invention relates to a control technique of a storage subsystem when failure occurs thereto.

BACKGROUND ART

In a computer system handling important data, a so-called redundant configuration is adopted, where many components are duplicated to prevent system failure or data loss caused by the failure of a component. The components within the storage subsystem and the paths (access paths) connecting the host computer and volumes of the storage subsystem are not an exception. In many cases, a configuration is adopted where the controller of the storage subsystem is duplicated, and the access paths connecting the host computer and the volumes of the storage subsystem are also duplicated. Thereby, continuous operation is made possible even when failure occurs to the controller, or when failure such as disconnection occurs to the access path.

Generally, in a storage subsystem where the controller is duplicated, when the host computer issues access requests to either one of the controllers, the access performance is not the same in many cases. For example, in a storage subsystem where two controllers, controller A and controller B, are installed, the access performance realized when an access request to a certain volume is issued to controller A may be lower than the access performance realized when the access request is issued to controller B. In other words, the performance may vary depending on the selection of the access path by the host computer.

A function to notify the priority of access paths from the storage subsystem to the host (ALUA (Asymmetric Logical Unit Access)) is known (Patent Literature 1). According to Patent Literature 1, a host having received information related to a priority of an access path from a storage subsystem executes access to the storage subsystem using a prioritized path, and when the prioritized path cannot be used due to failure, the host executes access to the storage subsystem using a non-prioritized path.

CITATION LIST

Patent Literature

[PTL 1] United States Patent Application Publication No. 2012/0254657

SUMMARY OF INVENTION

Technical Problem

Recently, with the aim to ensure high availability, and to realize high performance, storage subsystems having more than two controllers installed have become popular. However, as mentioned earlier, the access performance may vary according to the selection of the access paths, and the appropriate switch destination of the access path when failure occurs may vary according to the failure occurrence section. According to the art disclosed in Patent Literature 1, only the switching of access paths in a duplicated controller configuration is considered, and the appropriate selection of access paths when configuring the duplicated controller is not enabled.

Furthermore, the failure caused in the path formed between the host and the storage subsystem cannot be detected by the storage subsystem, so that no method is known to notify the appropriate access switch destination to the host in such case.

Solution to Problem

The storage subsystem according to one preferred embodiment of the present invention is configured to have multiple nodes each of which is composed of multiple control packages interconnected via an intra-node communication path, and control packages of different nodes are interconnected via an inter-node communication path having a lower data transfer rate than the intra-node communication path. When the storage subsystem detects failure, the priority determined for the control package is changed according to the failure occurrence section, and is notified to the host computer. The host computer determines the control package to be set as the appropriate issue destination of the access request based on the notified priority.

Advantageous Effects of Invention

According to the storage subsystem of the present invention, even when failure occurs, the host computer is enabled to access the storage subsystem using an appropriate alternate path.

BRIEF DESCRIPTION OF DRAWINGS

FIG. 5 is a view showing an example of a cluster configuration management information.

FIG. 6 is a view illustrating an example of a volume management information.

FIG. 7 is a view showing an example of a cache management information.

FIG. 9 is a view showing an example of a port management information.

FIG. 15 shows one example of format of response information to a REPORT TARGET PORT GROUPS.

FIG. 19 is a view showing the contents of process to be performed to a cache data of an owner change target volume in a storage subsystem according to Embodiment 1.

FIG. 24 is a view showing the contents of a process to be performed to a cache data of the owner change target volume in a storage subsystem according to Embodiment 3.

DESCRIPTION OF EMBODIMENTS

Hereafter, the storage subsystem according to preferred embodiments of the present invention will be described with reference to the drawings. The present invention is not restricted to the preferred embodiments illustrated here.

Regarding the respective elements described hereafter, the same type of elements are denoted by a same reference number having a suffix (such as a and b) attached thereto. When there is no need to distinguish the same type of elements in the description, they are only denoted with the reference number, and when there is a need to distinguish the same type of elements, they are denoted with the combination of reference number and suffix.

Embodiment 1

Figure 1:
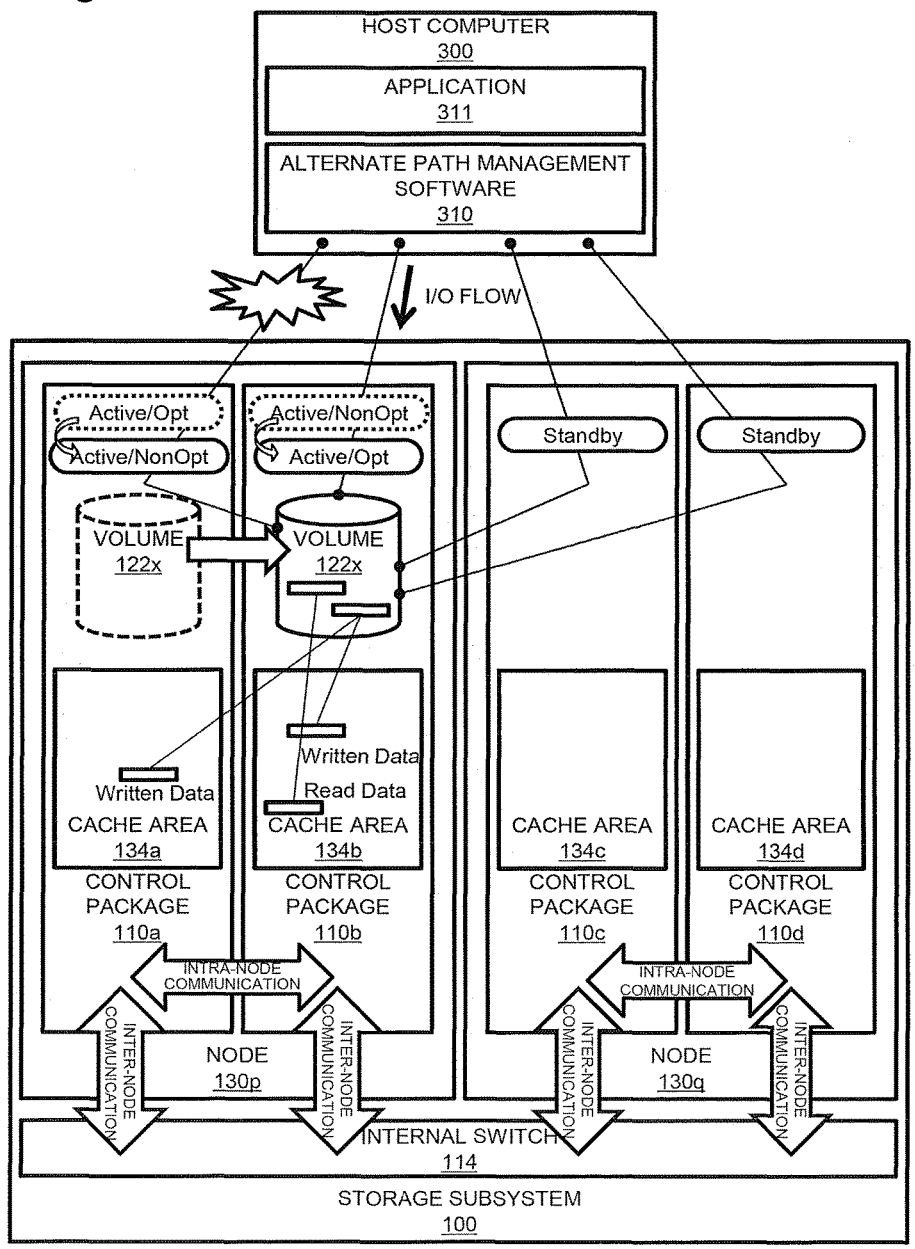
FIG. 1 is a view illustrating an outline of the process performed in a computer system according to Embodiment 1.

The outline of Embodiment 1 will be described with reference to FIG. 1. FIG. 1 shows the configuration outline of a computer system according to Embodiment 1, and a flow of data during processing of I/O requests. The storage subsystem 100 according to Embodiment 1 has multiple control nodes (also abbreviated as nodes) 130 having multiple control packages 110. In the configuration of FIG. 1, a node 130p includes control packages 110a and 110b, and a node 130p includes control packages 110c and 110d. Each control package 110 is a package board having a processor (MP) and a memory, for processing I/O requests from a host computer 300, and for controlling I/O processes to multiple drives (not shown) installed in the storage subsystem 100. Further, the storage subsystem 100 has a function for composing one or more logical volumes from multiple drives, and providing the same to the host computer 300.

In the storage subsystem 100 according to Embodiment 1, a control package 110 (owner) in charge of processing I/O requests to a logical volume is determined for each logical volume. FIG. 1 illustrates an example where the control package 110a is the owner of a logical volume 122x.

Each control package 110 has a cache area 134, which is used for temporarily storing the write data from the host computer 300 or the read data read from a drive. The storage subsystem 100 uses the cache area 134 as a so-called write-back cache, so that at the point of time when the write data is stored in the cache area 134, a notice notifying that the write processing has been completed is sent to the host computer 300. In order to prevent write data from being lost when failure occurs to the control package 110 or the like, when the control package 110a receives a write request and a write data from the host computer 300, it store the write data to the cache areas 134 of two control packages 110 (in the example of FIG. 1, the cache area 134a of the control package 110a and the cache area 134b of the control package 110b). In the preferred embodiment, the control package 110 having a replica of the write data stored in the cache area 134 is referred to as a "sub-owner".

Upon storing the write data to two cache areas 134, communication is performed using a communication path connecting the control packages. The respective control packages 110 within the respective nodes are connected via an intra-node communication path in a mutually communicatable manner. The respective control packages 110 belonging to different nodes are connected via an inter-node communication path in a mutually communicatable manner, but the inter-node communication path has a lower performance (a smaller transmission path capacity, or a greater access latency) compared to the intra-node communication path. Therefore, when storing the write data to the logical volume 122x in two cache areas 134, in principle, the data is stored in the cache area 134a of control package 110a which is the owner of the logical volume 122x, and in the cache area 134b of control package 110b within node 130p to which the control package 110a belongs.

The storage subsystem 100 according to Embodiment 1 adopts a protocol called ALUA (Asymmetric Logical Unit Access) standardized via SCSI standards. The host computer 300 operates to acquire the state (priority) of the port to each logical volume from the storage subsystem 100, and operates to issue an access request to the control package 110 having a port where the port state is Active/optimized. On the other hand, when the storage subsystem 100 receives a request (command) to acquire the port state with respect to a certain logical volume from the host computer 300, it returns a notice notifying that the state of the port of the control package 110 being the owner of the relevant logical volume is Active/optimized, and returns a notice that the state of the port of the control package 110 being the owner of the relevant logical volume is Active/non-optimized. In the example of FIG. 1, a notice is returned stating that the port state of control package 110a is Active/optimized, and that the port state of control package 110b is Active/non-optimized. As for the port state of control packages (110c, 110d) whose port states are neither Active/optimized nor Active/non-optimized, a notice stating that they are in Standby is returned. Thereby, when the host computer 300 accesses the logical volume, it can issue an access request to a control package 100 which is the owner thereof.

When a route (access path) from the host computer 300 to the control package 110a of the storage subsystem 100 is disconnected due to a failure or other causes, and the host computer 300 cannot access the control package 110a, the host computer 300 issues an access request (such as a read request) to the control package 110b having a port whose port state is Active/non-optimized. In that case, in the storage subsystem 100, the read request received by the control package 110b is transferred from the control package 110b to the control package 110a, and the process is performed in the control package 110a. The processing result is transferred from the control package 110a to the control package 110b, the control package 110b returns the processing result to the host computer 300. Since the access performance will be deteriorated when a large amount of data is communicated between the control packages 110, in the storage subsystem 100, a process is performed to move the owner of the logical volume 122x from the control package 110a to the control package 110b. A notice is sent from the storage subsystem 100 to the host computer 300 notifying that the state of port of the control package 110*a* has been changed to Active/non-optimized and that the state of port of the control package 110*b* is changed to Active/optimized.

Figure 2:
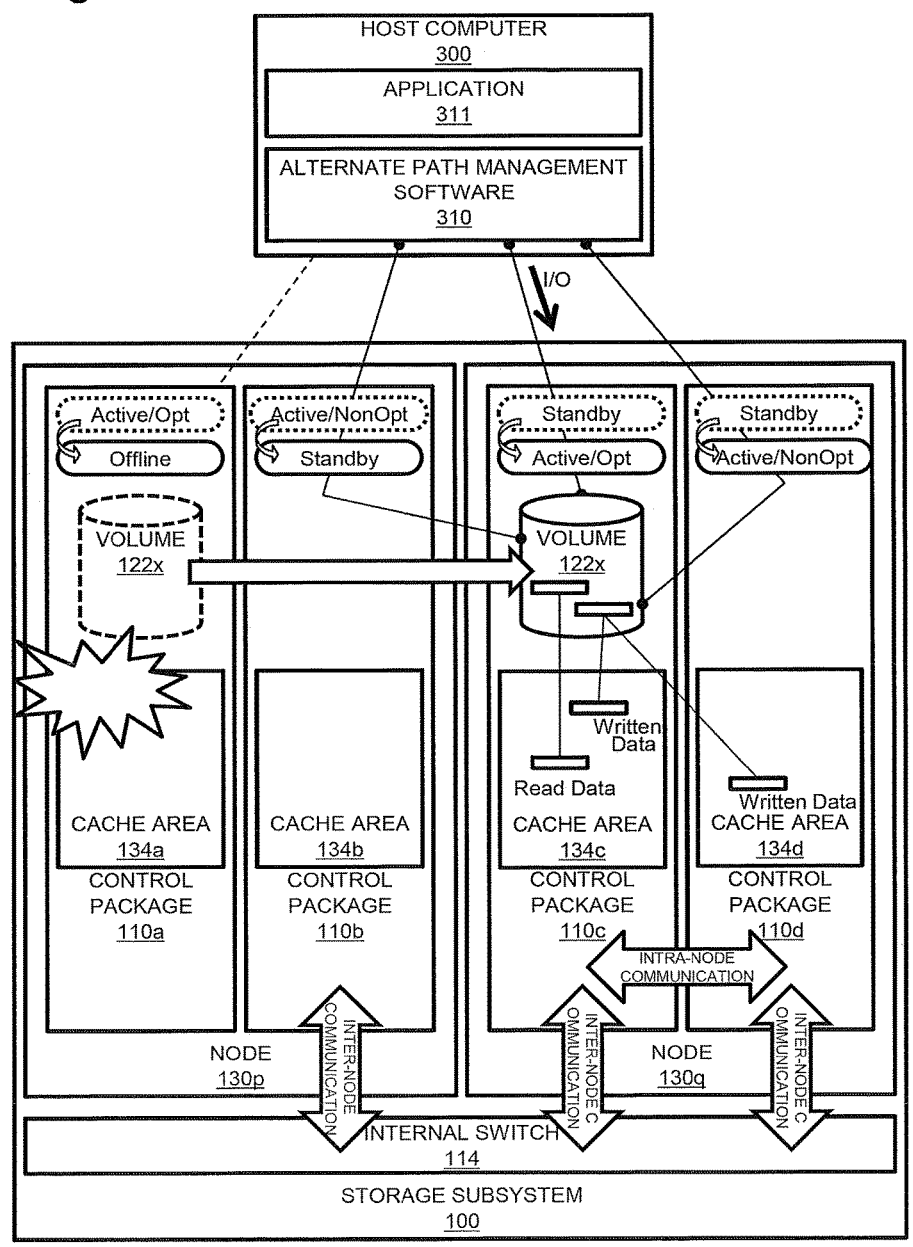
FIG. 2 is a view showing the outline of the process performed in the computer system according to Embodiment 1.

An example of a case where failure has occurred to the control package 110*a* and the control package 110*a* has stopped is illustrated in FIG. 2. In this case, unlike the case where the access path has been disconnected, the storage subsystem 100 moves the owner of the logical volume 122*x* from the control package 110*a* to the control package 110*c* (or 110*d*) within node 130*q*. When the control package 110*a* stops, the replica of write data cannot be stored in the cache area 134*a*, so that when the owner of the logical volume 122*x* is moved to the control package 110*b*, the control package 110*b* must transfer the write data, in addition to the cache area 134*b*, to the control packages 110 (110*c* or 110*d*) within a node (node 130*q*) other than the node 130*p*, and the access performance is deteriorated thereby.

Further, a notice is sent from the storage subsystem 100 to the host computer 300 notifying that the state of the port of the control package 110*a* has been changed to Offline, the state of the port of the control package 110*b* is changed to Standby, the state of the port of the control package 110*c* is changed to Active/optimized, and the state of the port of the control package 110*d* is changed to Active/non-optimized. Regarding the port whose state is set to Standby or Offline, the host computer 300 does not issue an access request. When the host computer 300 notifies that the state of the port has been changed, thereafter, it issues an access request to a port (port of control package 110*c*) whose port state is Active/optimized.

As described, according to the storage subsystem 100 of Embodiment 1, the owner of the logical volume is changed appropriately according to the failure occurrence section of the computer system, and an information of the control package of the appropriate access destination (port of the control package newly becoming the owner of the logical volume) is notified to the host computer. Therefore, it becomes possible to prevent the access performance to the logical volume from being deteriorated compared to before owner change. The present embodiment is appropriate for purposes having strict performance conditions, such as an on-line transaction processing.

Figure 3:
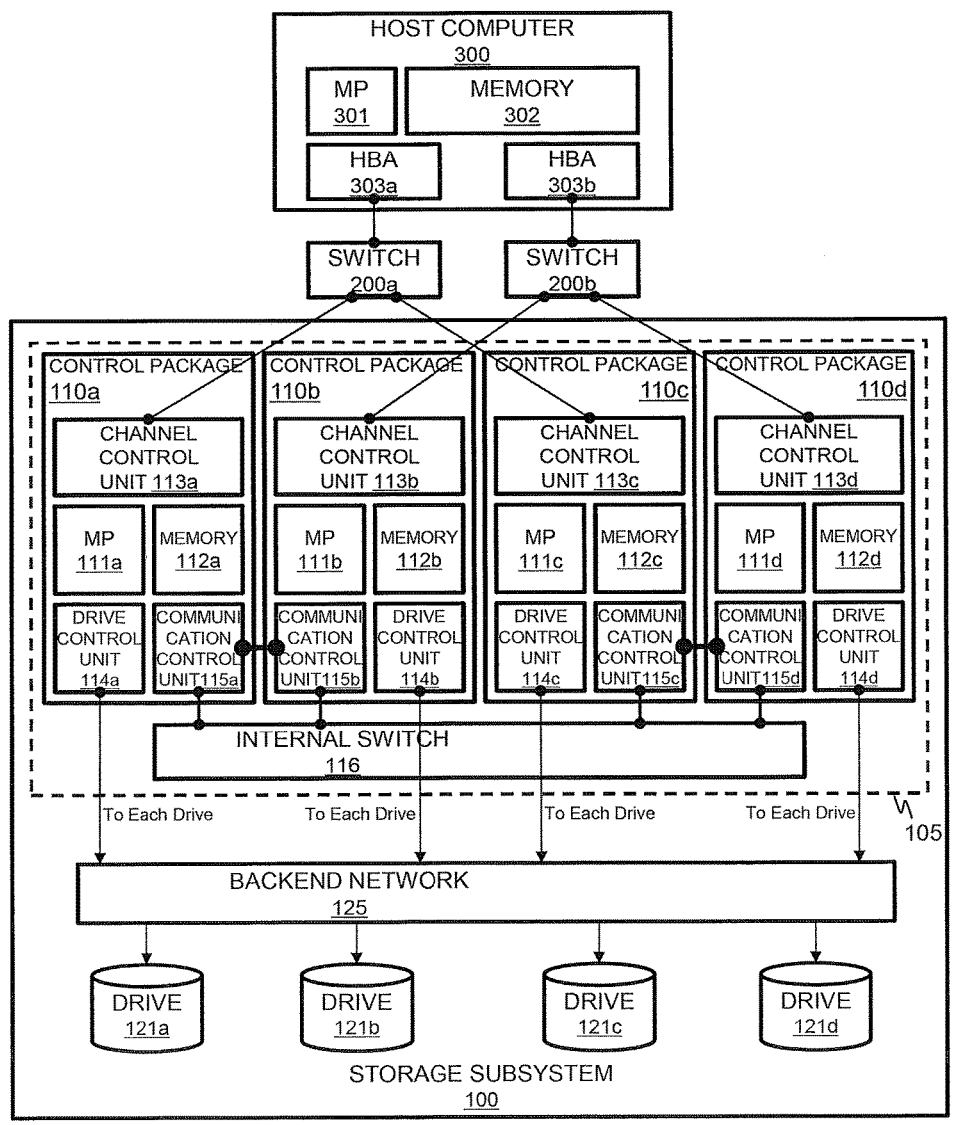
FIG. 3 is a configuration diagram of a computer system and a storage system according to the preferred embodiment.

Hereafter, the respective elements and operations of the computer system according to Embodiment 1 will be described. FIG. 3 illustrates a configuration of a computer system according to Embodiment 1. The computer system adopts a configuration where the storage subsystem 100 and the host computer 300 (hereinafter also abbreviated as "host 300") are connected via switches 200*a* and 200*b*.

The storage subsystem 100 is composed of a storage controller 105 formed by mutually connecting multiple control packages 110 via an internal switch 116, and multiple drives 121 connected to the control packages 110 via a backend network 125. The drive 121 is a storage device storing write data from the host computer 300, and an HDD (Hard Disk Drive) is used as the drive 121, for example. However, a storage device other than HDDs, such as SSDs (Solid State Drives), can be used.

In FIG. 3, four control packages 110*a*, 110*b*, 110*c* and 110*d* have been illustrated as the control packages 110, but the number of control packages is not necessarily limited to four. According further to FIG. 3, four drives 121, which are drives 121*a*, 121*b*, 121*c* and 121*d*, are illustrated, but the number of drives is also not limited to four. The internal switch 116 can be made redundant.

The control package 110 is a component for processing I/O requests from the host 300, and to perform data accesses to the drive 121. The control package 110 is composed of a processor 111 (denoted as "MP" in the drawings), a memory 112, a channel control unit 113, a drive control unit 114, and a communication control unit 115.

The channel control unit 113 is a component having an interface for connecting the storage subsystem 100 to the host 300, which relays I/O requests (commands) and write data from the host 300. The channel control unit 113 is one or more ports for connecting to the switch 200 or the host 300. One example of the interface is a Fibre Channel interface as the interface. Unless otherwise stated, a configuration example is described where each channel control unit 113 has only one port. However, the present embodiment is effective even when the channel control unit 113 has multiple ports.

The drive control unit 114 is a component for connecting the control package 110 to the drives 121, and relays I/O requests and data to be transmitted to the drives 121. The drive control unit 114 has one or more backend interfaces for connecting to the drive 121 or the backend network 125. A SAS (Serial Attached SCSI) is used, as an example, as the interface for connecting the drive control unit 114 and the drive 121 or the backend network 125.

The MP 111 is a component for executing various processes in the storage subsystem 100. For example, it interprets commands received from the host 300 and writes data to the drive 121 or reads data therefrom.

The memory 112 is used for storing the programs executed by the MP 111, or the management information and the like used by the MP 111. Further, the memory 112 is also used as a so-called disk cache for temporarily storing the write data arriving from the host 300 or the data read from the drive 121. In the following description, the area used as disk cache out of the areas within the memory 112 is called a "cache area".

The backend network 125 is a network composed of a SAS link and a SAS expander, for example, when the interface used by the drive 121 and the drive control unit 114 is a SAS. By having the drive control unit 114 and the drive 121 of the respective control packages 110 connect to the backend network 125, the respective control packages 110 are configured to be accessible to all drives 121.

The communication control unit 115 is a component for performing communication among the control packages 110. The storage subsystem 100 according to Embodiment 1 has two types of communication paths as the communication path among the control packages 110. Then, the communication control unit 115 is connected to these two types of communication paths. The two types of communication paths connecting the communication control unit 115 can be made redundant.

The first communication path is a communication path for mutually connecting the communication control units 115 of the control packages 110 without having the internal switch 116 intervened, and this communication path is called an "intra-node communication path". The communication using the intra-node communication path is called an "intra-node communication". In FIG. 3, the line directly connecting communication control unit 115*a* and communication control unit 115*b* and the line directly connecting communication control unit 115*c* and communication control unit 115*d* represent the intra-node communication paths.

In the storage subsystem 100 of Embodiment 1, the set of control packages connected via the intra-node communication path, that is, the set of control packages 110 which are mutually communicable via intra-node communication, is called a "node". In the configuration example of FIG. 3, a set of control package 110*a* and control package 110*b* constitutes one node. Similarly, a set of control package 110*c* and control package 110*d* also constitutes one node. However, the number of control packages 110 constituting the node is not limited to two. It is possible to have three or more control packages 110 included in one node. The number of nodes is not limited to two, and three or more nodes can be included in the storage subsystem 100.

In the following description, when focus is given to a certain control package 110, the control package belonging to the same node as the relevant control package is called an "adjacent package", out of the control packages other than the relevant control package. In the configuration example of FIG. 3, the control package 110*b* is called an adjacent package of the control package 110*a*. On the other hand, the control package 110*a* can be called an adjacent package of the control package 110*b*.

The second communication path is a communication path for mutually connecting the control packages 110 via the internal switch 116, and this communication path is called an "inter-node communication path". The communication using the inter-node communication path is called an "inter-node communication". The communication control unit 115 has at least one or more interfaces for connecting to each of the two types of communication paths, which are an intra-node communication path and an inter-node communication path.

The intra-node communication path has a better performance than the inter-node communication path. In the present embodiment, the description that the communication has a "better performance" means that, for example, that the transmission path capacity (data transfer speed) is greater, and/or that the access latency is shorter. For example, if the data transfer quantity per unit time of the intra-node communication path is A (MB/sec), the data transfer quantity per unit time of the inter-node communication path is B (MB/sec), (wherein the relationship of A>B is satisfied). The intra-node communication path is for directly mutually connecting the communication control units, but the inter-node communication path is a communication path that passes the internal switch 116, so the access latency of the inter-node communication path becomes longer than the intra-node communication path. However, since the intra-node communication path has implementation limits, such as the short transmission length, so that it is difficult to connect all the control packages 110 within the storage subsystem 100 to the same intra-node communication path. Therefore, according to the storage subsystem 100 of Embodiment 1, the intra-node communication path is used only for connecting a portion of the control packages 110 mutually (practically, the control packages 110 within the same node), and the inter-node communication path is used to connect all the control packages 110.

Inter-node communication is used to perform communication between control packages 110 belonging to different nodes. On the other hand, when communication is performed between control packages 110 belonging to the same node, both the inter-node communication and intra-node communication can be used. Since the intra-node communication path has a greater transmission path capacity (higher performance), intra-node communication is used to perform communication between control packages 110 belonging to the same node.

Next, the configuration of the host computer 300 will be described. The host computer has, at least, a processor (MP) 301, a memory 302, and multiple HBAs (Host Bus Adapters) 303 (303*a* and 303*b*). The MP 301 executes programs stored in the memory 302. The HBAs 303 are interfaces for connecting the host computer 300 to the storage subsystem 100 via a switch 200.

In the computer system according to Embodiment 1, multiple HBAs 303 are provided so that access from the host computer 300 to the storage subsystem 100 is enabled continuously even when failure occurs to one of the components within the computer system. Further, two switches 200 are provided to prevent the path between the host computer 300 and the storage subsystem 100 from becoming the single point of failure, and HBA 303*a* and HBA 303*b* are respectively connected to different switches (200*a* and 200*b*). The switch 200*a* is connected to control packages 110*a* and 110*c*, and the switch 200*b* is connected to control packages 110*b* and 110*d*. According to the computer system of Embodiment 1, the host computer 300 and the storage subsystem 100 are connected in the described manner, so that access paths are provided from the host computer 300 to all the control packages 110 within the storage subsystem 100.

Figure 4:
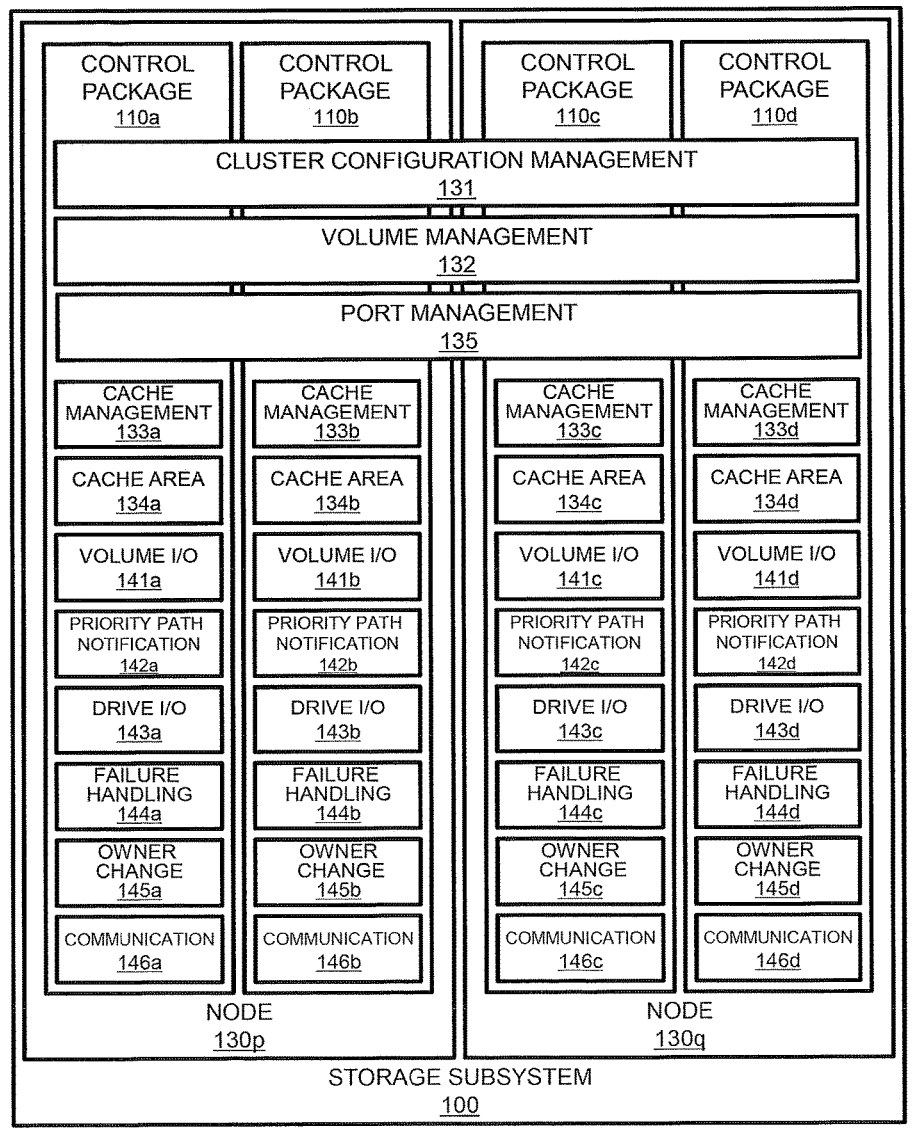
FIG. 4 is a view illustrating contents of various information and programs stored in a memory of the storage subsystem.

Next, the various information and programs stored in the memory 112 of the storage subsystem 100 will be described with reference to FIG. 4.

Four types of management information, a cluster configuration management information 131, a volume management information 132, a port management information 135 and a cache management information 133, are stored in the memory 112 of the storage subsystem 100. The details of the respective management information are as described with reference to FIG. 5 and thereafter. In the drawings of FIG. 5 and thereafter, the data structures of the respective management information are shown as tables, but the respective management information can also be managed as data structures other than tables.

All the management information are stored in the memories 112 of all the control packages 110. However, the contents of the cluster configuration management information 131, the volume management information 132 and the port management information 135 stored in the memories 112 are all managed to be the same. That is, when the MP 111*a* of the control package 110*a* changes the content of the cluster configuration management information 131 stored in the memory 112*a*, the update content is transmitted to the other control packages 110 via intra-node communication and/or inter-node communication, and update of the cluster configuration management information 131 is performed in the respective control packages 110.

The example of the cluster configuration management information 131 is illustrated in FIG. 5. According to the storage subsystem 100 of Embodiment 1, a unique identifier is assigned to each control package 110 for management, and this identifier is called a "package ID". A unique identifier is also assigned to the nodes, and this identifier is called a "node ID". According to the storage subsystem 100 of Embodiment 1, a non-negative integer is used as the identifier (package ID, node ID and the like), but the present invention is not restricted thereto. In the present embodiment, the package IDs of the control packages 110*a*, 110*b*, 110*c* and 110*d* illustrated in FIG. 3 and the like are 0, 1, 2 and 3, respectively.

The cluster configuration management information 131 is information for managing the relationship between package ID and node ID, and the state of the respective control packages 110. Each row of the cluster configuration management information 131 represents information of one control package 110. The package ID of the control package 110 being the management target is stored in package ID (131-1), and a node ID of the node belonging to the relevant control package 110 is stored in the node ID (131-2) of the same row. Information on the state of the relevant control package is stored in state (131-3).

One of the following information, "normal", "blockade" or "not installed", is entered in the state (131-3). When "normal" is stored in the state (131-3), it means that the state of the relevant control package 110 is in a normal state. When "blockade" is stored, it means that failure has occurred to the relevant control package 110, and that the package is not operating. When "not installed" is stored, it means that the relevant control package 110 is not installed in the storage subsystem 100. For example, when a control package 110 is removed from the storage subsystem 100, "not installed" is stored therein.

In the MP 111 of the respective control packages 110, a program (failure handling program (144) described later) for detecting the states of the respective control packages 110 is operating, and when the state of the control package 110 (assuming that the control package 110 has a package ID "7") is changed (such as when failure occurs to the control package 110 and the package stops operating, or when the control package 110 is removed), the MP 111 of the control package 110 having detected the state changes the content of state (131-3) of the row where the package ID (131-1) is 7 in the cluster configuration management information 131 stored in the memory 112 within the control package 110 being detected. At the same time, the changed content is also notified to other control packages 110, so that the contents of the cluster configuration management information 131 in the memories 112 of other control packages 110 are also caused to be changed. That is, the cluster configuration management information 131 is updated synchronously in all control packages 110.

Next, we will describe the volume management information 132. At first, we will describe the volume defined in the storage subsystem 100 of Embodiment 1. In the storage subsystem 100 according to Embodiment 1, a single RAID (Redundant Arrays of Inexpensive Disks) group is formed using multiple drives 121. Thereby, even when failure occurs to one (or two) drive(s) 121 within the RAID group and data access is disabled, the data stored in the remaining drives 121 in the RAID group can be used to recover the data stored in the drive 121 where failure has occurred.

Further, the storage subsystem 100 provides a storage area of the RAID group as a logical volume to the host computer 300. Therefore, it is configured so that the logical volume is recognized from the host computer 300 but that the drives 121 are not recognized from the host computer 300. The storage subsystem 100 of Embodiment 1 adopts a configuration where the storage area of one RAID group is mapped to one logical volume. In the present embodiment, a logical volume is used as the same meaning as a volume, and the logical volume is sometimes abbreviated as "volume".

The storage subsystem 100 provides a unique identifier within the storage subsystem 100 to each logical volume, and manages the logical volumes. This identifier is called a "volume ID". Similarly, a unique identifier is assigned within the storage subsystem 100 to the respective drives 121. This identifier is called a "drive ID". In the storage subsystem 100 according to Embodiment 1, the volume ID is equal to a LUN (Logical Unit Number) used as an identifier for uniquely specifying a volume when the host computer 300 issues a command to the volume. However, the present invention is not restricted to this configuration.

The storage subsystem 100 determines, for each logical volume, one or two control packages 110 in charge of processing I/O requests to the logical volume from the host computer 300. A first control package 110 in charge of processing the I/O requests to a certain logical volume is called an "owner", and a second control package in charge of processing the I/O requests to a certain logical volume is called a "sub-owner". The details will be described later, but the control package 110 being the sub-owner has a role to store the replica of the write data to the logical volume.

A write data to a logical volume from the host computer 300 is temporarily stored in the cache area 134 of the control package 110 determined as the owner or the sub-owner. The administrator of the storage subsystem 100 can set or change the control package 110 being the owner or the sub-owner. According to the state of the storage subsystem 100, the owner or the sub-owner of a certain logical volume can be changed by the storage subsystem 100.

The volume management information 132 is information for managing the information of the drives 121 constituting the logical volume, the owner of the logical volume, the information of the sub-owner, and so on, for each logical volume. FIG. 6 illustrates an example of the volume management information 132. Each row of the volume management information 132 represents the information of the logical volume. Each row includes the entries of a volume ID (132-1), a state (132-2), a RAID configuration (132-3), a drive ID (132-4), an owner ID (132-5), a sub-owner ID (132-6), and a non-optimal path I/O frequency (132-7).

A volume ID of a logical volume is stored in the volume ID (132-1). One of the following information, "steady", "undefined" or "change-ongoing", is stored in the state (132-2). When the logical volume is operated in a normal state, "steady" is stored therein. When the logical volume is undefined, "undefined" is stored therein. If a process to change the owner or the sub-owner of a logical volume is being performed, "change-ongoing" is stored therein.

Information related to the drive IDs of the drives constituting a RAID group to which the storage area of the logical volume is associated with, and the RAID configuration of the relevant RAID group, are respectively stored in the drive ID (132-4) and the RAID configuration (132-3). Information related to the RAID configuration refers to the information on the RAID level representing the redundancy level of the RAID group, and the number of redundancy information (such as parity) generated for storing data to the relevant RAID group and the number of data used for generating the redundancy information. For example, if "RAID6 (14D+2P)" is stored in the RAID configuration (132-3), it means that the RAID level is RAID6, and that two redundancy information (parities) are generated from 14 data and stored according to the configuration.

The package ID of the control package 110 being the owner of the logical volume and the package ID of the control package 110 being the sub-owner of the logical volume are respectively stored in the owner ID (132-5) and the sub-owner ID (132-6). Depending on the state of the storage subsystem 100, the sub-owner may not be set. In that case, an invalid value (numerical value that cannot be used as package ID, such as "−1"; in the present specification, when an invalid value is stored in the field of the management information, "n/a" is entered) is stored in the sub-owner ID (132-6).

A frequency of I/O requests arriving at a port of a control package 110 other than the owner is stored in the non-optimal path I/O frequency (132-7).

Similar to the cluster configuration management information 131, the contents of the volume management information 132 are synchronously updated in all the control packages 110. The contents of the port management information 135 are also synchronously updated in all the control packages 110, the details of which will be described later.

Next, the cache management information 133 will be described with reference to FIG. 7. This information is managed independently in the respective control packages 110, unlike the cluster configuration management information 131 and the volume management information 132. The cache management information 133 in other control packages 110 will not be updated in synchronization with the update of the cache management information 133 in the control package 110a.

The control package 110 of the storage subsystem 100 stores the write data subjected to a write request from the host computer 300 to the storage area of the logical volume or the read data subjected to a read request therefrom temporarily in the cache area 134. The cache management information 133 is a management information of data stored in the cache area 134. A block, which is a minimum unit of access when the host 300 accesses the logical volume (512 bytes in general), is used as a single unit for management as the unit for managing the cache area by the cache management information 133. Therefore, information related to data stored in the 512-byte-area in the cache area 134 is stored in one row of the cache management information 133.

Entries of a cache address (133-1), a state (133-2), a volume ID (133-3), and an LBA (133-4) are included in each row of the cache management information 133. A volume ID of a logical volume and an address in the relevant logical volume (Logical Block Address) are respectively stored in the volume ID (133-3) and the LBA (133-4). Thereby, it is shown that the data in the block of the logical volume specified by the volume ID (133-3) and the LBA (133-4) are stored (cached) in the 512-byte area within the cache area 134 having the cache address (133-1) set as the start address.

Information regarding the state of the cached data is stored in the state (133-2). The information stored in the state (133-2) is selected from "Clean", "Free" or "Dirty". When "Free" is stored in the state (133-2), it means that data is not stored in that area (area specified by the cache address (133-1)). When "Clean" is stored in the state (133-2), it means that data is stored in that area (area specified by the cache address (133-1)), but the content of the data is already reflected in the drive 121 (the data in this state is called "clean data"). When "Dirty" is stored in the state (133-2), it means that data is stored in that area (area specified by the cache address (133-1)) and the data is not yet reflected in the drive 121 (so-called dirty data).

The cache management information 133 is information used only for managing the cache area 134 within the respective control packages 110. Therefore, for example, only the management information in the cache area 134a within the control package 110a is stored in the cache management information 133a of the control package 110a.

Next, the outline of the programs operating in the host computer 300 and the data flow within the storage subsystem 100 during I/O processing will be described with reference to FIG. 8. At least an application (AP) 311 and an alternate path software 310 are running in the host computer 300. The AP 311 is a program for performing read and write of data with respect to a volume provided by the storage subsystem 100, one example of which is a business program such as a database management system (DBMS). However, the present is applicable regardless of the type of program of the AP 311.

The alternate path software 310 is a program for switching the access paths when failure occurs to one of the multiple paths connecting the host computer 300 and the volume 122x of the storage subsystem 100 and access to the volume cannot be performed, and hiding the failure from a superior program, such as the AP 311.

The data flow when a write request or a read request is received from the host computer 300 to the volume 122x is described with reference to FIG. 8. In the following description, an example is illustrated where the control package 110a is the owner of volume 122x and the control package 110b is the sub-owner of volume 122x. FIG. 8 shows that the object of volume 122x is illustrated within the control package 110a, meaning that the control package 110a is the owner of the volume 122x. In the following description, a view showing a volume existing in a control package 110x (x is a reference of a through d) means that the owner of the relevant volume is the control package 110x.

When the port of the control package 110a receives a write request and a write data to the volume 122x from the host computer 300, the control package 110a stores the write data to the own cache area 134a, and instructs the control package 110b to store the write data to the cache area 134b of the control package 110b via the intra-node communication path. When the write data is stored in the cache areas 134a and 134b, the control package 110a returns a notice that the write processing has been completed to the host computer 300. When multiple ports exist in the control package 110a, the same process as the process described above is performed regardless of which port had received the write request. The access performance will not vary regardless of which port had received the read access.

The reason why the storage subsystem 100 writes the write data to both the cache areas 134a and 134b is that when failure occurs to the control package 110a before writing the write data to the drive 121, and the cache area 134a cannot be accessed, the write data will be lost unless the write data is left in an area other than the cache area 134a. Therefore, the storage subsystem 100 writes the write data to the cache areas 134 of at least two control packages 110.

Further, the reason why the storage subsystem 100 writes the write data to the cache area 134b and not the cache area 134c (or 134d) is that the instruction from the control package 110a to the control package 110b can be sent via intra-node communication, but the instruction from the control package 110a to the control packages 110c or 110d requires inter-node communication, and the performance is deteriorated compared to having the instruction sent to the control package 110b. That is, in principle, the storage subsystem 100 is configured so that the control package 110 belonging to the same node as the owner control package 110 is set as the sub-owner.

The data (dirty data) stored in the cache area 134 is stored asynchronously as the write requests from the host computer 300 to the drive 121. The process for storing the data of the cache area 134 to the drive 121 is called "destaging". When destaging is ended, the write data is deleted (discarded) from the cache area 134b of the control package 110b which is the sub-owner. Further, the dirty data having been stored in the cache area 134a of the owner control package 110a is handled as clean data after completing destaging.

When the port of the control package 110a receives a read request to the volume 122x from the host computer 300, the control package 110a confirms whether the data (read target data) set as the read target by the read request is stored in its own cache area 134a. When the read target data is stored in the cache area 134a, the data in the cache area 134a is returned to the host computer 300. When the read target data is not stored in the cache area 134a, data is read from the drive 121 and returned to the host computer 300. Further, at this time, data is also stored into the cache area 134a. When multiple ports exist in the control package 110a, the same process as the process described above is performed regardless of which port the read request had been received by. The access performance will not be varied regardless of which port the read request had been received by.

The data flow described above assumes that the access request is received by the control package 110 determined as the owner (in the above-described example, the control package 110a). If the port of the control package 110 which is not the owner receives the access request, a flow somewhat different from the one described above is adopted. When the port of the control package 110b receives a read request from the host computer 300 to the volume 122x, the control package 110b transfers the read request via the intra-node communication path to the control package 110a set as the owner. Thereafter, the control package 110b returns the read data transferred from the control package 110a via the intra-node communication path to the host computer 300.

Further, when the read request to volume 122x from the host computer 300 is received by the port of the control package 110c (or 110d), the control package 110c (or 110d) transfers the read request via the inter-node communication path to the control package 110a set as the owner. Thereafter, the control package 110c (or 110d) returns the read data transferred from the control package 110a via the inter-node communication path to the host computer 300. However, according to the storage subsystem 100 of Embodiment 1, in principle, an event where the access request to a volume whose owner is the control package 110a is received by a control package 110c (or 110d) belonging to a node that differs from the control package 110a will not occur. It is an event that may occur in the storage subsystem 100 according to Embodiment 2 (described later).

As described, when the control package 110 that is not the owner receives the read request, a need occurs to transfer the read request and the read data between control packages 110. When the control package 110b belonging to the same node as the control package 110a receives an access request, data transfer via intra-node communication occurs. When the control package 110c (or 110d) belonging to a node that differs from the control package 110a receives the access request, data transfer via inter-node communication occurs. Therefore, when the control package 110b belonging to the same node as the control package 110a receives an access request, the access performance will be better compared to the case where the access request is received by the control package 110c (or 110d) belonging to a different node from the control package 110a.

In any case, when the control package 110 which is not the owner receives the access request, the access performance is deteriorated compared to the case where the control package 110 which is the owner receives the read request. As described, according to the storage subsystem 100 of Embodiment 1, a difference occurs in the access performances depending on the control package 110 having received the access request, so that it is preferable for the host computer 300 to be configured to issue the access request to the volume to a control package 110 which is the owner thereof. In order to realize this configuration, an example of using an ALUA protocol described later will be described.

The storage subsystem 100 according to Embodiment 1 adopts a protocol called ALUA (Asymmetric Logical Unit Access) standardized via SCSI specification. The storage subsystem supporting ALUA has a function to notify the state (priority) of the port to which the access request should be issued in each logical volume to the host computer 300. The storage subsystem 100 according to Embodiment 1 uses this function to issue the priority of the control package 110 being the issue destination of the access request regarding a certain logical volume to the host computer 300. Then, the host computer 300 operates to issue an access request to (a port of) the control package 110 having the highest priority based on the notified information.

According to the ALUA, a set of one or more ports is managed as a group called "target port group". The target port group is determined for each logical volume. In the case of the storage subsystem 100 according to Embodiment 1, all the ports within one control package 110 are managed as one target port group. Further, the ports within different control packages 110 are managed to belong to different target port groups.

Specifically, all the ports within the control package 110 (in the case of FIG. 8, the control package 110a) which is the owner of a certain logical volume 122x are managed as one target port group (called a first target port group). All the ports within the control package 110 (in the case of FIG. 8, the control package 110b corresponds) which is the sub-owner of the certain logical volume 122x are managed as a target port group (called a second target port group) which differs from the first target port group. Further, the ports within the control packages 110 other than the control packages 110a and 110b are also managed, for each control package 110, as target port groups that differ from the first and second target ports groups.

In the present embodiment, each target port group determined for each single logical volume (assuming that the ID of this logical volume is n) has a unique identifier, and the identifier of the target port group (target port group determined for a logical volume whose volume ID is n) to which the port of each control package 110 belongs is set to be equal to the package ID. That is, the identifier of the target port group (target port group determined for a logical volume whose volume ID is n) to which the port of the control packages 110a, 110b, 110c and 110d (as described earlier, the package IDs of these packages are 0, 1, 2 and 3, respectively) belong, are 0, 1, 2 and 3, respectively.

The ports of the respective control packages 110 have unique identifiers within the target port group, wherein the identifier of the port within the control package 110 whose package ID is k is determined as (k+1). That is, the identifiers of the ports of the control packages 110a, 110b, 110c and 110d are 1, 2, 3 and 4, respectively.

In the following description, the identifier of the target port group is called a "target port group ID", and the identifier of the port is called a "port ID".

The respective ports of the storage subsystem supporting ALUA have at least the following four states.
 a) Active/optimized
 b) Active/non-optimized
 c) Standby
 d) Offline Port states other than the states described above are defined according to ALUA, and the respective ports of the storage subsystem 100 according to Embodiment 1 may also have a port state other than the four states mentioned above. However, only the four states related the most to the description of the present embodiment will be described. In the following description, sometimes the state of a) is called "optimum", the state of b) is called "non-optimum", the state of c) is called "standby", and the state of d) is called "disconnected". The ports belonging to the same target port group are determined to have the same port state.

If the state of the port is either Active/optimized or Active/non-optimized, the relevant port can receive a read or a write command from the host 300, and can return a normal response. However, in ALUA, the port whose port state is Active/optimized has the highest priority. When the state of the port is Active/non-optimized, it means that the port has the second highest priority (a lower priority than the port in Active/optimized state). The Active/non-optimized state is set to a port having a lower access performance than when accessing the volume via a port having an Active/optimized state. Therefore, according to the storage subsystem 100 of Embodiment 1, the state of each port belonging to the first target port group is set to Active/optimized, and the state of each port belonging to the second target port group is set to Active/non-optimized.

When a read or write command has been issued to the port whose state is Standby, the storage subsystem will not perform read or write processes, and will not return a normal response to the command issue source. However, if a command for returning the state of a volume or a path, such as INQUIRY command or REPORT TARGET PORT GROUPS command and the like described later, is issued to the relevant port, the storage subsystem returns a normal response.

When the state of the port is Offline, it means that the port is in a state not capable of receiving commands from the host computer 300. According to the storage subsystem 100 of Embodiment 1, the state of each port within the control package which is neither the owner nor the sub-owner is set to Standby or Offline. The state of the port within a normal control package 110 of the control package which is neither the owner nor the sub-owner is set to Standby, and the port state within an abnormal (blocked) control package 110 is set to Offline.

The states of the ports (and port groups) determined with respect to each logical volume are shown in the port management information 135 of FIG. 9. The port ID of a port whose port state is Active/optimized is stored in port Active/opt (135-12), and the port group ID to which the relevant port belongs is stored in port group Active/opt (135-11). A port ID of a port whose port state is Active/non-optimized is stored in port Active/nonopt (135-22), and a port group ID to which the relevant port belongs is stored in port group Active/nonopt (135-21). A port ID of the port whose port state is Standby is stored in port Standby (135-32), and port group ID belonging to the relevant port is stored in port group Active/Standby (135-31). A port ID of the port whose port state is Offline is stored in a port Offline (135-42), and a port group ID to which the relevant port belongs is stored in a port group Active/Offline (135-41). When the storage subsystem 100 sets or changes the owner of the logical volume, the content of the port management information 135 is also updated.

When the host computer 300 accesses a certain logical volume, if the state of each port set to the relevant logical volume is known, the access performance to the logical volume can be improved by issuing the I/O request (read or write command) to the port whose state is Active/optimized. Further, when an I/O request cannot be issued to the port whose port state is Active/optimized (for example, a case corresponds where failure has occurred to the access route (path) from the host computer to the relevant port), the I/O request should be issued to the port whose port state is Active/non-optimized.

The storage subsystem supporting the ALUA supports the command (REPORT TARGET PORT GROUPS command) for returning the states of the respective ports to the host computer. By issuing this command to the storage subsystem 100, the host computer 300 can recognize the port (port whose port state is Active/optimized) to which the access request should be issued. Further, when issuing this command, the identification number (LUN) of the logical volume is also designated, so that the storage subsystem having received this command returns the state of the respective ports corresponding to the designated logical volume to the command issue source. The details will be described later.

Figure 8:
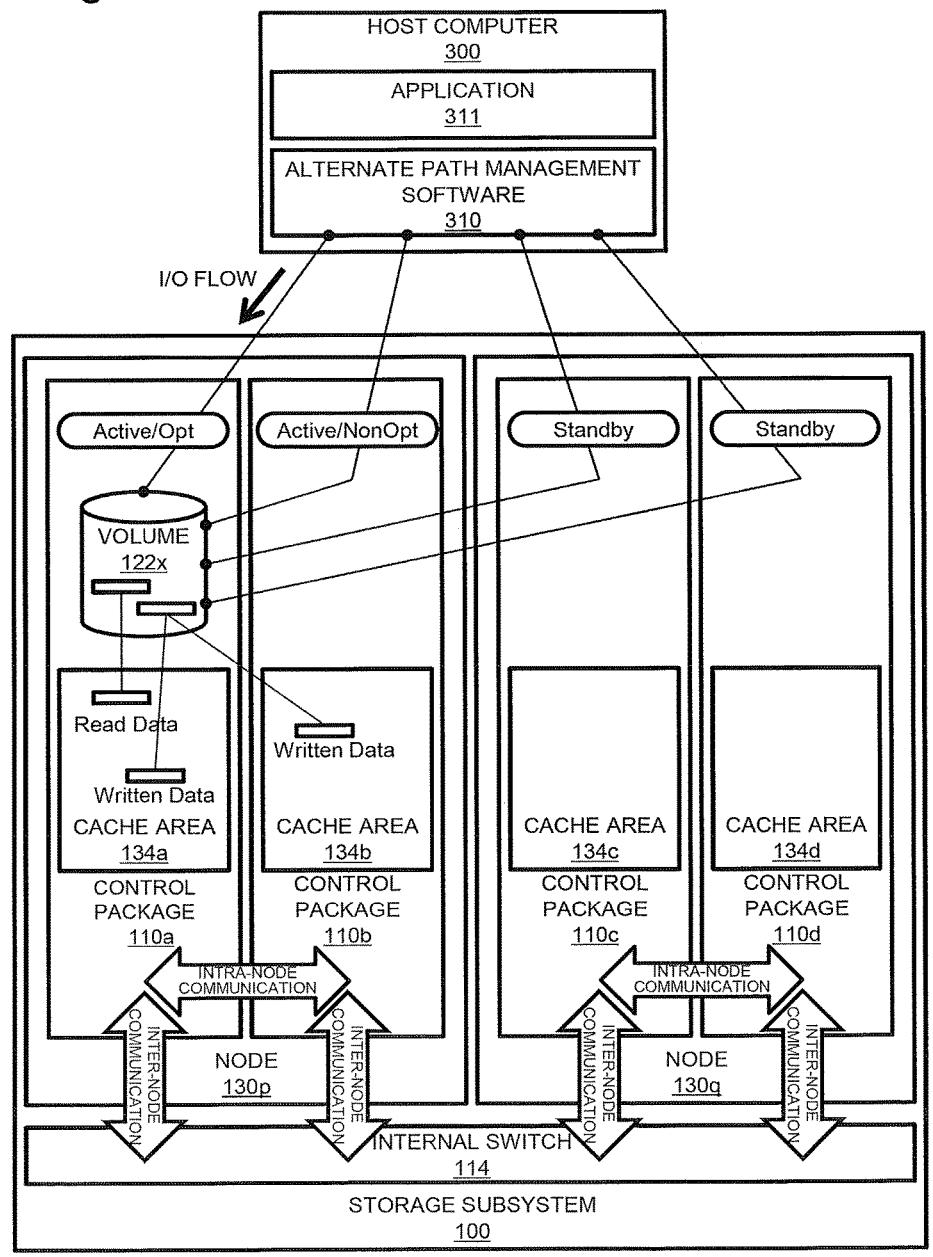
FIG. 8 is a view showing an outline of data flow within the storage subsystem.

In the example of FIG. 8, regarding the state (priority) of each port set to the logical volume 122x, the state of the port of the control package 110a is set to Active/optimized, and has the highest priority. The state of the port of the control package 110b is Active/non-optimized, which is set to have the second highest priority. The state of the ports of control packages 110c and 110d are set to Standby. When the host computer 300 issues a REPORT TARGET PORT GROUPS command to acquire the state of the respective ports set to the logical volume 122x, the storage subsystem 100 responds that the state of the port of the control package 110a is Active/optimized, the state of the port of the control package 110b is Active/non-optimized, and the state of the control packages 110c and 110d is Standby.

As mentioned earlier, since the states of all the ports within one control package 110 are the same, acquiring the states (priorities) of the respective ports using the REPORT TARGET PORT GROUPS command are equivalent to acquiring the information of the control package 110 (priority of each control package 110) to which the access request should be issued with priority when accessing the logical volume 122x.

In the host computer 300, the alternate path management software 310 manages the states of the respective ports. When the alternate path management software 310 receives an I/O request to the volume from a superior program such as the AP 311, the alternate path management software 310 transmits an I/O request to the port whose state of the port is Active/optimized. As a result of transmitting the I/O request to a port whose state is Active/optimized, if an error is returned or if there is no response, the alternate path management software 310 operates to transmit the I/O request to the port whose state is Active/non-optimized.

Figure 10:
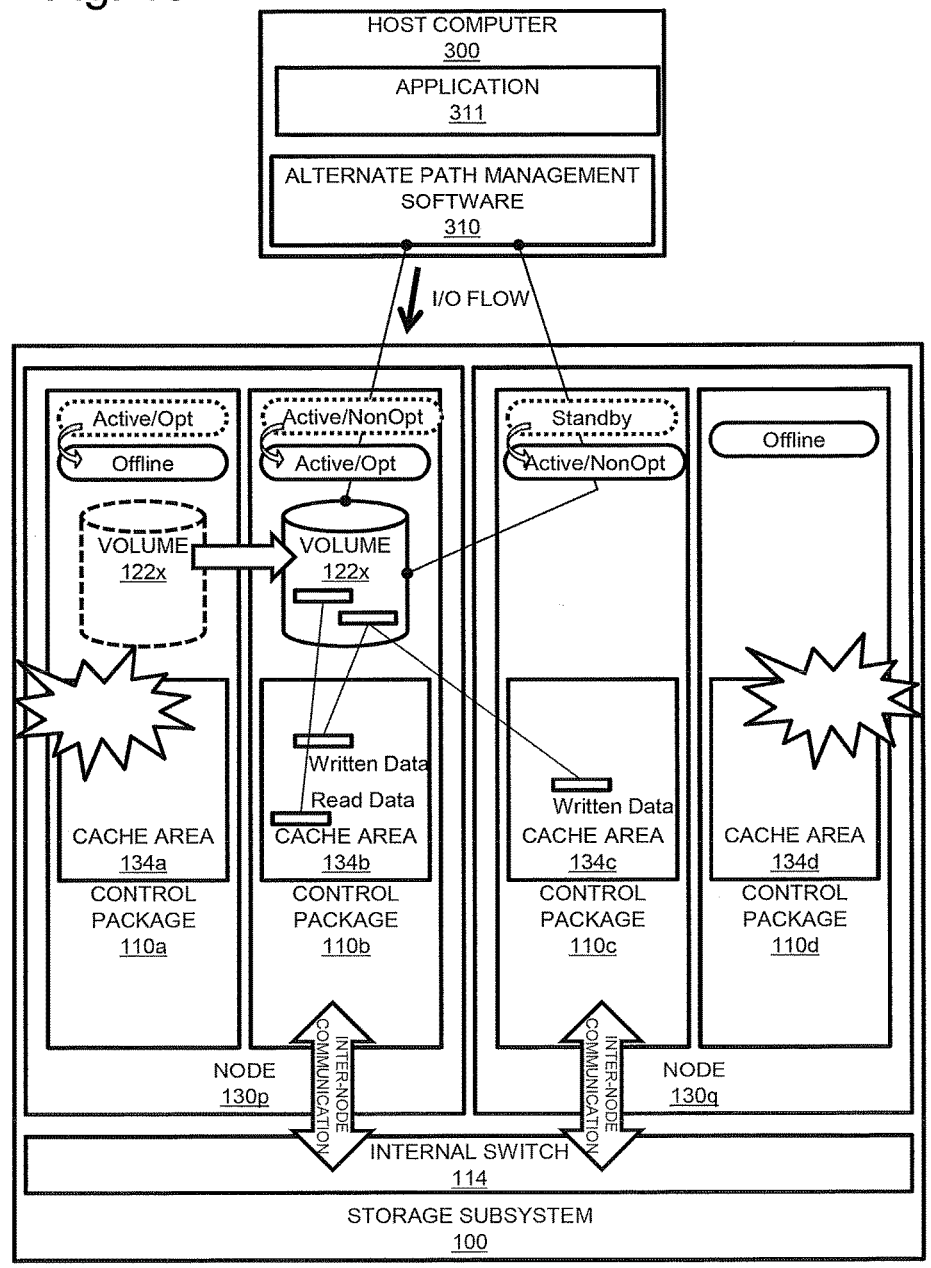
FIG. 10 is a view showing an outline of a process performed in the computer system according to Embodiment 1.

The owner of the volume should preferably be changed when the state of the storage subsystem 100 or the state of the computer system is changed. Next, the outline of the process performed in the storage subsystem 100 when failure occurs to the computer system in Embodiment 1 will be described with reference to FIGS. 8, 1, 2 and 10. FIG. 8 illustrates a state prior to occurrence of failure, and FIGS. 1, 2 and 10 are views showing the state of the computer system when failure has occurred. As shown in FIG. 8, before failure occurs, the control package 110a is the owner of volume 122x. The sub-owner of volume 122x is the control package 110b.

FIG. 2 is a view illustrating the outline of the process performed when failure occurs to the control package 110a, and control packages 110b through 110d are all normal. When failure occurs to the control package 110a, the control package 110a cannot perform access to the volume 122x, so that a different control package 110 must be set as the owner of the volume 122x. Since the control packages 110b through 110d are all operating normally, any one of the control packages 110b through 110d can be set as the owner.

However, when storing the write data from the host computer 300 to the cache area 134, the write data must be written to at least two cache areas 134. Assuming that the control package 110b is set as the new owner, the storage subsystem 100 must store the write data to the cache area 134c or 134d in addition to the cache area 134b. In that case, data transmission using the inter-node communication path occurs, and the access performance is deteriorated.

Therefore, when failure occurs to the control package 110a, if multiple normal control packages 110 do not exist in the node, the storage subsystem 100 operates to select the control packages 110 to be the owner and/or the sub-owner from a node where multiple normal control packages 110 exist whenever possible. In the configuration of the storage subsystem 100 illustrated in FIG. 2, only two control packages 110 exist in one node, so that a state is shifted where the owner of the volume 122x is changed to the control package 110c (and the sub-owner is changed to the control package 110d). When the owner is changed as described, the write data from the host computer 300 is stored in the two cache areas 134 (cache areas 134c and 134d) within the node, so that an equivalent access performance as that before the occurrence of failure can be maintained. However, even when failure occurs to the control package 110a, if the configuration has multiple normal control packages 110 existing in the node in which the control package 110a exists (that is, when three or more control packages 110 exist in one node), the respective control packages 110 within the node can also be set as the owner and the sub-owner.

When the owner of the volume 122x is changed from the control package 110a to a different control package 110 (such as control package 110c), the control package 110 of the access request issue destination of the host computer 300 should be the control package 110c. Therefore, the storage subsystem 100 notifies the host computer that the port state has changed, after the owner had been changed. In the case of FIG. 2, a notice is sent to the host computer 300 stating that the state of the port in the control package 110c is Active/optimized, the state of the port in the control package 110d is Active/non-optimized, the state of the port in the control package 110b is Standby, and the state of the port in the control package 110a is Offline. When the host computer 300 detects that the state of the port has been changed (the timing when the change of port state is noticed will be described later), the I/O request will be issued to the port of the control package 110c whose port state is Active/optimized.

FIG. 10 is a view illustrating an outline of the process performed when failure occurs to the control package 110a. The difference from FIG. 2 is that failure has already occurred in the control package 110d, and the control package 110d is in a blocked state.

In this case, even if the owner of the volume 122x is changed from the control package 110a to the control package 110c which belongs to a different node (as the node to which the control package 110a belongs), when storing the write data to two cache areas 134, the control package 110c must store the data in the cache area 134c and cache area 134b. In order to store the write data in the cache area 134b, it is necessary to use an inter-node communication path, and the access performance will not be improved. That is, even if the owner is moved to the control package 110c, the access performance will not be improved compared to the case where the owner is moved to the control package 110b, so that in this case, the owner will not be moved to the control package 110 of a different node, and the owner is moved to the control package 110b. However, it is also possible to move the owner to a control package 110 belonging to a different node.

As illustrated in FIG. 10, according to the port state notified to the host computer 300, it is notified that the state of the port in the control package 110b is changed to Active/optimized, the state of the port in the control package 110c is changed to Active/non-optimized, and the state of the port in the control package 110a is changed to Offline (and that the state of the port in the control package 110d is Offline).

FIG. 1 illustrates an outline of the process performed when failure occurs to the path connecting the host computer 300 and the control package 110a but failure has not occurred in the storage subsystem 100. In this case, the storage subsystem 100 moves the owner of the volume 122x from the control package 110a to the control package 110b, and also changes the control package 110a to be the sub-owner of the volume 122x. This is because in the above case, the control package 110a is normal and the cache area 134a is accessible.

Of course, as described in the example of FIG. 2, the owner and sub-owner can be changed so that the control package 110 of a different node is set as the owner and sub-owner. However, in general, a control package 110 of a different node is operated as an owner of other logical volumes (than the logical volumes whose owner had been the control package 110a). If the control package 110 of the other node is changed to the owner of the logical volume whose owner had been the control package 110a, the load of the control package 110 of the other node becomes high, and as a result, the access performance of the logical volume is deteriorated. Therefore, if there is no failure in the control package 110, the storage subsystem 100 sets the control package 110 within the node as the owner or the sub-owner whenever possible.

When the write data is received from the host computer 300 after the owner has been moved to the control package 110b, the control package 110b writes the write data to its own cache area 134b, and further instructs the control package 110a via the intra-node communication path to store the write data in the cache area 134a. Based on this instruction, the control package 110a stores the write data in the cache area 134a.

As shown in FIG. 1, regarding the port state notified to the host computer 300, it is notified that that the state of the port in the control package 110b is changed to Active/optimized. Further, it is notified that the state of the port in the control package 110a is changed to Active/non-optimized.

As shown in FIG. 1, the problem of having failure occur to the path is that the storage subsystem 100 cannot determine whether the owner of the volume 122x should be changed or not since failure has not occurred to the storage subsystem 100. However, when failure occurs to the path, the host computer 300 cannot issue an I/O request to the control package 110a which is the owner of the volume 122x, so that the setting of the alternate path management software 310 is changed so as to issue the I/O request to the port within the control package 110b whose port state is Active/non-optimized. As a result, a large amount of I/O requests arrive at the control package 110b. Therefore, according to the storage subsystem 100 of Embodiment 1, at the point of time when it detects that a large amount of I/O requests have arrived at the control package 110 which is not the owner (the control package 110 which is the sub-owner), it determines that failure has occurred to the path connecting the host computer 300 and the control package 110*a*, and operates to change the owner.

Next, we will describe the various programs executed in the storage subsystem 100. Major programs installed in the storage subsystem 100 are a volume I/O program (141), a priority path notification program (142), a drive I/O program (143), a failure handling program (144), an owner change program (145), and a communication program (146). In the following description, in order to prevent the description from becoming lengthy, the program is sometimes described as the subject of operation when executing the processes, but actually, the processes are performed by the MP 111 executing the programs. Further, each program is stored in the memories 112 of all control packages 110, and all the MPs 111 of the control packages 110 execute the programs listed above.

The volume I/O program (141) is a program executed when an I/O request (read command or write command) has been received from the host computer 300. The priority path notification program (142) is a program executed when the REPORT TARGET PORT GROUPS command has been received from the host computer 300. The failure handling program (144) is a program executed periodically, and by having this program executed by the MP 111, the MP 111 can detect the control package 110 that is not operating normally in the storage subsystem 100, and when a control package 110 that is not operating normally exists, it performs necessary measures, such as the change of owner.

The owner change program (145) is executed by being called by other programs. When change of owner or sub-owner of a logical volume is required, the other programs call the owner change program (145).

The drive I/O program (143) is executed when the MP 111 reads data from the drive 121 to the memory 112 (specifically, the cache area 134 in the memory 112), or when data is written from the memory 112 to the drive 112. In the present embodiment, the process for reading data from the drive 121 to the memory 112 is called "staging", and the process for writing data from the memory 112 to the drive 121 is called "destaging". The staging and destaging processes are processes also performed in the known storage subsystems having disk cache.

Further, according to the destaging process performed in the storage subsystem 100 of the present embodiment, in principle, the control package 110 being the owner of the logical volume performs destaging of the dirty data in its own cache area 134 to be destaged to the relevant logical volume to the drive 121 constituting the logical volume. Then, after destaging the data, the control package being the owner thereof notifies the control package 110 of the sub-owner which stores the replica of the relevant data to discard the replica of the relevant data. When the control package being the sub-owner receives this notice, it discards (deletes) the replica of the relevant data stored in its own cache area 134. When the data stored in the cache area 134 is discarded, the area having stored the relevant data can be used freely for purposes such as storing other data. In the present specification, the process for discarding the data stored in the cache area 134 is sometimes called "freeing".

The communication program (146) is a program for performing data communication among control packages 110. When the MP 111 of a certain control package 110 transmits requests and data to other control packages 110, or when it receives requests and data from other control packages 110, it executes the communication program (146).

As mentioned earlier, an intra-node communication path and an inter-node communication path exist in the storage subsystem 100 of the present embodiment. Therefore, if the transmission destination of the request or data is the control package 110 within the same node, the communication program (146) executed by the MP 111 of a certain control package 110 transmits the request or the data via the intra-node communication path. If the transmission destination of the request or data is the control package 110 of a different node, it transmits the request or the data via the inter-node communication path.

Figure 11:
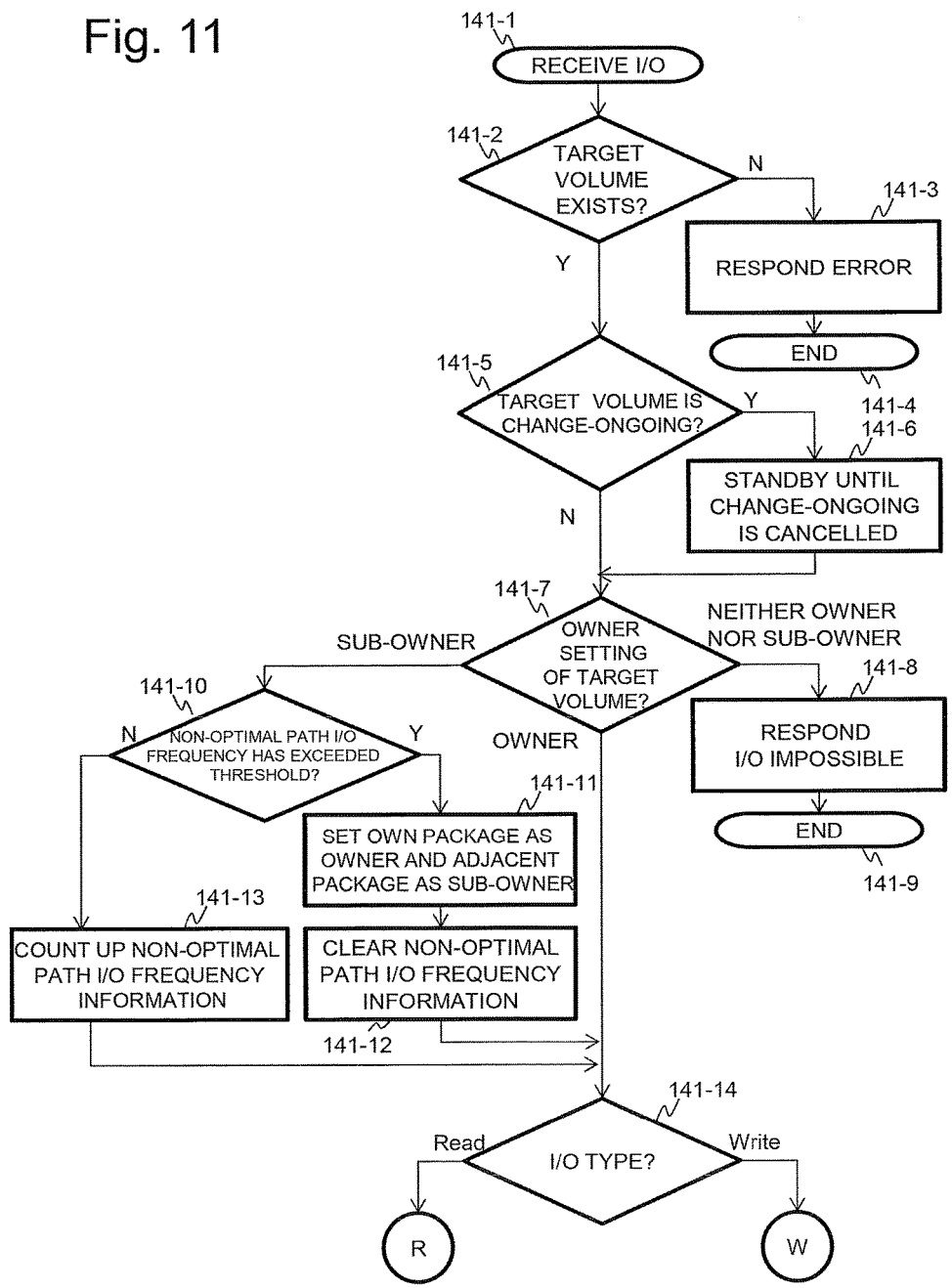
FIG. 11 is a process flow (1) of a volume I/O program according to Embodiment 1.
Figure 12:
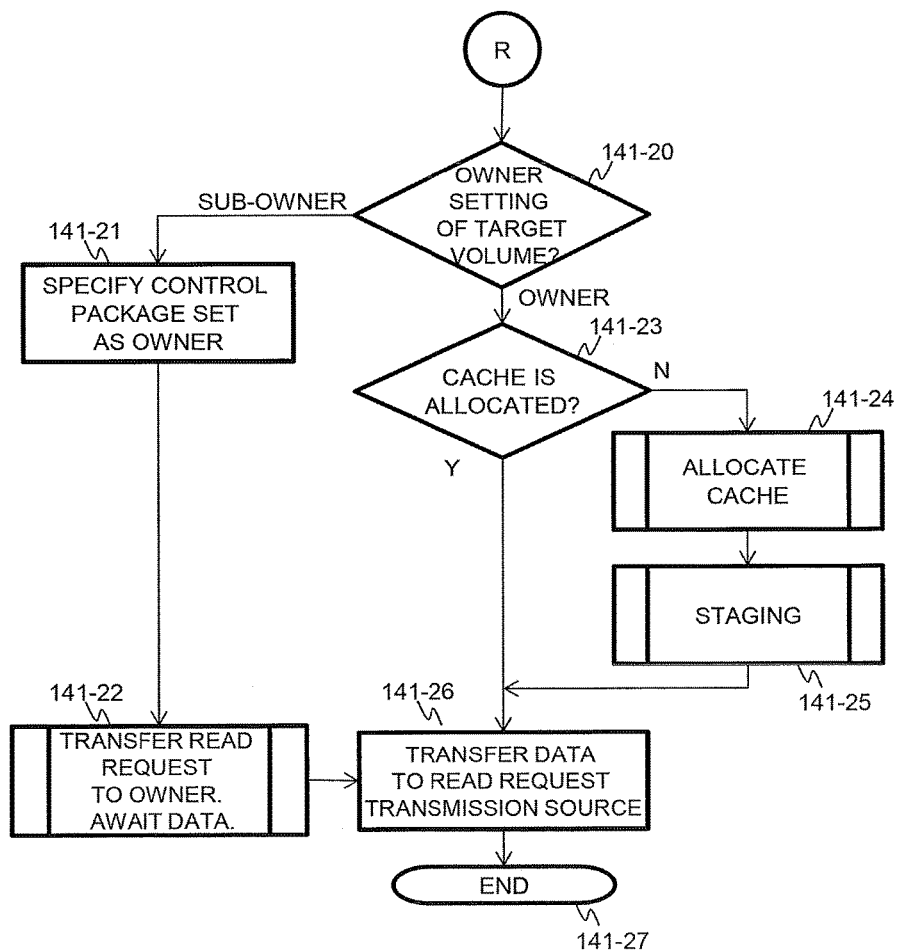
FIG. 12 is a process flow (2) of a volume I/O program according to Embodiment 1.
Figure 13:
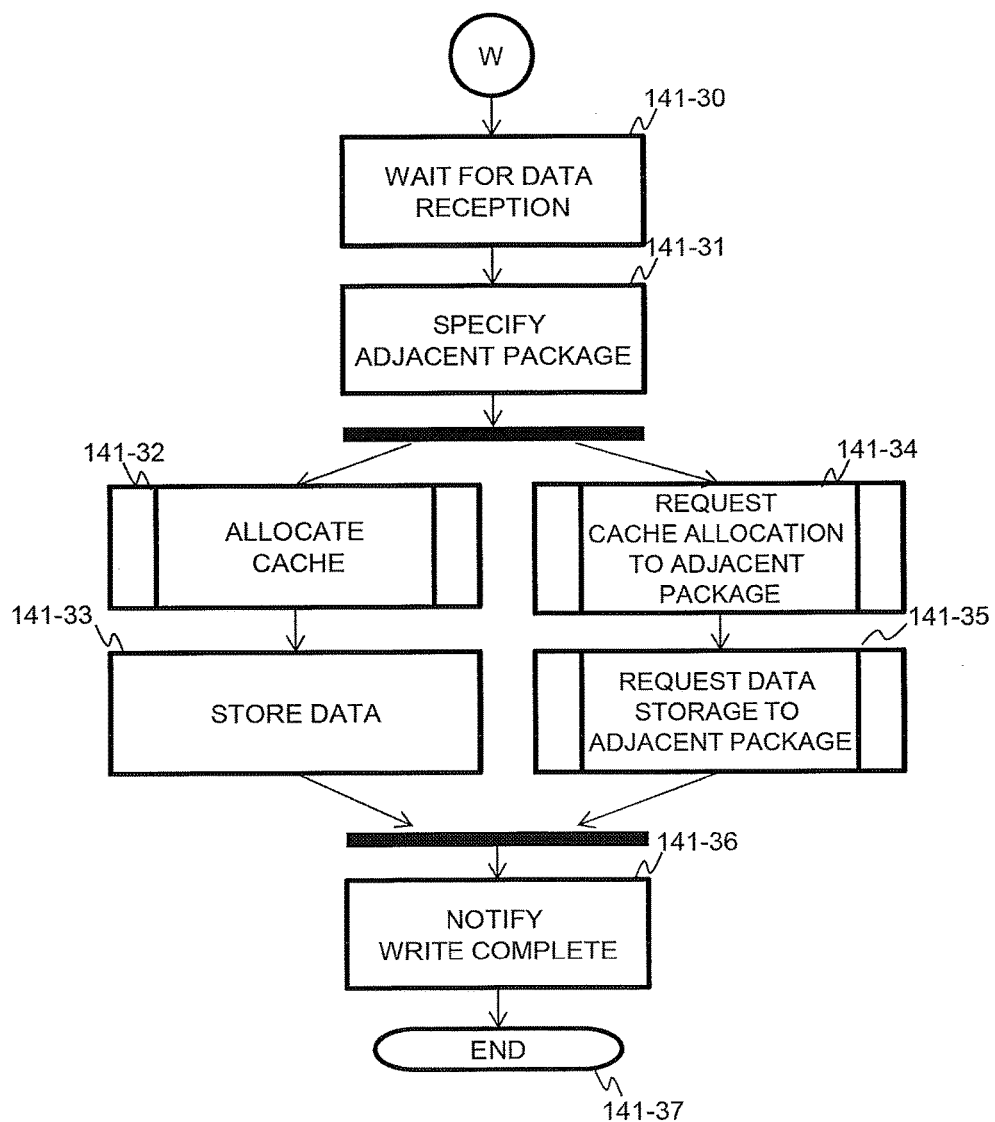
FIG. 13 is a process flow (3) of a volume I/O program according to Embodiment 1.

Next, the flow of the process executed by the volume I/O program (141) will be described with reference to FIGS. 11 through 13.

When an I/O request (read or write command) is received from the host computer 300 (step 141-1), the MP 111 determines whether a read or write destination volume (hereafter, this volume is called a "target volume") designated by the I/O request exists or not (step 141-2). Since an identifier (LUN) of the access target logical volume is included in the I/O request, in step 141-1, the MP 111 determines whether there is a row where the volume ID (132-1) within the volume management information 132 is equal to the LUN included in the access request, and where the state (132-2) is not "undefined". When there is a row where the volume ID (132-1) is equal to the LUN included in the access request and the state (132-2) is not "undefined", it means that the target volume exists.

If the target volume exists (step 141-2: Y), the MP 111 executes the steps of step 141-5 and thereafter, but if the target volume does not exist (step 141-2: N), the MP 111 returns an error to the host computer 300 (step 141-3), and ends the process.

In step 141-5, a process is performed to determine whether the target volume is in change-ongoing state or not. The MP 111 determines whether the state (132-2) of the row where the volume ID (132-1) in the volume management information 132 is equal to the LUN included in the access request (hereinafter, this row is called an "access target row") is "change-ongoing" or not. If the state (132-2) is "change-ongoing" (step 141-5: Y), the MP 111 waits until the state (132-2) is changed from "change-ongoing" to "steady". If the state (132-2) is not "change-ongoing" (step 141-5: N), the MP 111 executes the processes of step 141-7 and thereafter.

In step 141-7, the MP 111 confirms the owner of the target volume. The owner of the target volume can be confirmed by referring to the owner ID (132-5) and the sub-owner ID (132-6) of the access target row. Further, the MP 111 executing the volume I/O program (141) can recognize the package ID (this package ID is called an "own package ID") of the control package 110 to which it belongs (exists) (hereinafter, this control package is called an "own package"). The MP 111 compares the own package ID with the owner ID (132-5) and the sub-owner ID (132-6) of the access target row.

As a result of the comparison, if the own package ID is equal to the owner ID (132-5) of the access target row, since the owner package is the owner of the access target volume, the MP 111 executes the process of step 141-14. If the own package ID is equal to the sub-owner ID (132-6) of the access target row, it means that the own package is the sub-owner of the access target volume, so the MP 111 executes the process of step 141-10. If the own package ID is neither equal to the owner ID (132-5) nor the sub-owner ID (132-6) of the access target row, it means that the own package is neither the owner nor the sub-owner of the access target volume, so the MP 111 responds to the host computer 300 that I/O processing is impossible (step 141-8), and ends the process.

In step 141-10, the MP 111 refers to the non-optimal path I/O frequency (132-7) of the access target row, and determines whether the non-optimal path I/O frequency (132-7) has exceeded a given threshold or not. As mentioned earlier, when a large amount of I/O requests arrive at the control package 110 which is the sub-owner, the storage subsystem 100 operates to change the owner. In order to determine whether a large amount of I/O requests has arrived or not, the MP 111 uses the information of the non-optimal path I/O frequency (132-7) of the access target row. Each time an I/O request arrives at the control package 110 being the sub-owner, the MP 111 performs a process to add 1 to the value of the non-optimal path I/O frequency (132-7) (which is executed in step 141-13 described later). Therefore, by referring to the information of the non-optimal path I/O frequency (132-7), it becomes possible to determine whether a large amount of I/O requests has arrived at the control package 110 being the sub-owner.

If it is determined in step 141-10 that the non-optimal path I/O frequency (132-7) has not exceeded the given threshold (step 141-10: N), the MP 111 adds 1 to the non-optimal path I/O frequency (132-7) (step 141-13), and executes the process of step 141-14.

In step 141-10, if it is determined that the non-optimal path I/O frequency (132-7) has exceeded a given threshold (step 141-10: Y), the MP 111 calls the owner change program (145), and performs a process to change the own package to the owner of the target volume, and to change the adjacent package of its own package to be the sub-owner of the target volume (step 141-11). The flow of the process performed by the owner change program (145) will be described later.

After step 141-11, the MP 111 clears the value of the non-optimal path I/O frequency (132-7) (to 0), and executes the process of step 141-14.

In step 141-14, the MP 111 determines whether the received I/O request is a read command or a write command. This is enabled by referring to the contents of the I/O request. If the I/O request is a read command, the processes of step 141-20 and thereafter are executed (FIG. 12). If the I/O request is a write command, the processes of step 141-30 and thereafter are executed (FIG. 13).

In step 141-20, the MP 111 confirms the owner of the target volume, and determines whether the own package is the owner of the access target volume or the sub-owner thereof. This is enabled by performing a similar process as the process performed in step 141-7. If the own package is the owner of the access target volume, the process of step 141-23 is executed. If the own package is a sub-owner of the access target volume, it executes the process of step 141-21.

In step 141-21, the MP 111 specifies the control package of the owner of the target volume (which can be specified by referring to the owner ID (132-5) of the access target row), and in step 141-22, the MP 111 calls the communication program (146), to transfer the received I/O request (read command) to the control package specified in step 141-21. Then, it waits for the read data to be returned from the control package having transferred the I/O request. In the control package to which the I/O request had been transferred, data read from the cache area 134 or the drive 121 is performed based on the contents of the I/O request, and the read data is returned to the control package having transferred the I/O request.

In step 141-21, the MP 111 determines whether the data set as the target in the I/O request (read command) is stored in the cache area 134 or not. This determination is performed by referring to the cache management information 133. If the data is not stored in the cache area 134 (step 141-23: N), the MP 111 allocates the area for storing the read data in the cache area 134 (step 141-24), and calls the drive I/O program (143), to thereby stage the data in the area allocated in the cache area 134.

In step 141-26, the MP 111 transfers the staged data (when step 141-25 has been executed) or data returned from the owner control package 110 (when step 141-22 has been executed) to the host computer 300 being the request source of the I/O request (read command), and ends the process.

If the received I/O request is a write command (step 141-14: Y), the processes of step 141-30 and thereafter are executed. In step 141-30, the MP 111 waits for the write data to be transmitted from the host computer 300, which is the issue source of the write command. The transmitted write data is stored, for example, in the buffer of the channel control unit 113.

When the reception of write data is completed, the MP 111 specifies the adjacent package of its own package (141-31). If each node is composed of two or smaller control packages 110, the MP 111 can specify one package ID whose node ID (131-2) is equal to the node ID of the node to which the own package belongs, by referring to the cluster configuration management information 131. The package ID specified here is the package ID of the adjacent package. The MP 111 specifies the adjacent package in this manner.

As another embodiment, especially when each node is composed of three or more control packages 110, the MP 111 specifies the adjacent package by referring to the volume management information 132. The MP 111 determines whether the own package is an owner or a sub-owner, by referring to the owner ID (132-5) and the sub-owner ID (132-6) of the volume management information 132. If the own package is the owner, the control package 110 specified by the sub-owner ID (132-6) will be the adjacent package. Further, if the own package is the sub-owner, the control package 110 specified by the owner ID (132-5) will be the adjacent package.

In the following process, the MP 111 stores the write data in the cache area 134 of its own package (steps 141-32 and 141-33), and also simultaneously performs a process to have the adjacent package store the write data to the cache area 134 of the adjacent package (steps 141-32 and 141-33).

At first, we will describe the process for storing the write data in the cache area 134 of the own package. In step 141-32, the MP 111 allocates the area for storing the write data in the cache area 134, and in step 141-33, it stores the write data in the allocated area. There may be a case where the area for storing the write data is already allocated before executing step 141-32, and in that case, there is no need to allocate the area in step 141-32.

The following processes are performed for storing the write data in the cache area 134 of the adjacent package. In step 141-34, the MP 111 instructs the adjacent package to allocate an area for storing the write data in the cache area 134. Thereafter, in step 141-34, it transmits an instruction to store the write data to the allocated area and the write data to the adjacent package. The transmission of the instruction and the write data to the adjacent package is performed by calling the communication program (146).

When the storage of write data to the cache area 134 of the own package and the adjacent package is completed, the MP 111 notifies the host computer 300 that the write processing has been completed (step 141-36), and ends the process.

Figure 14:
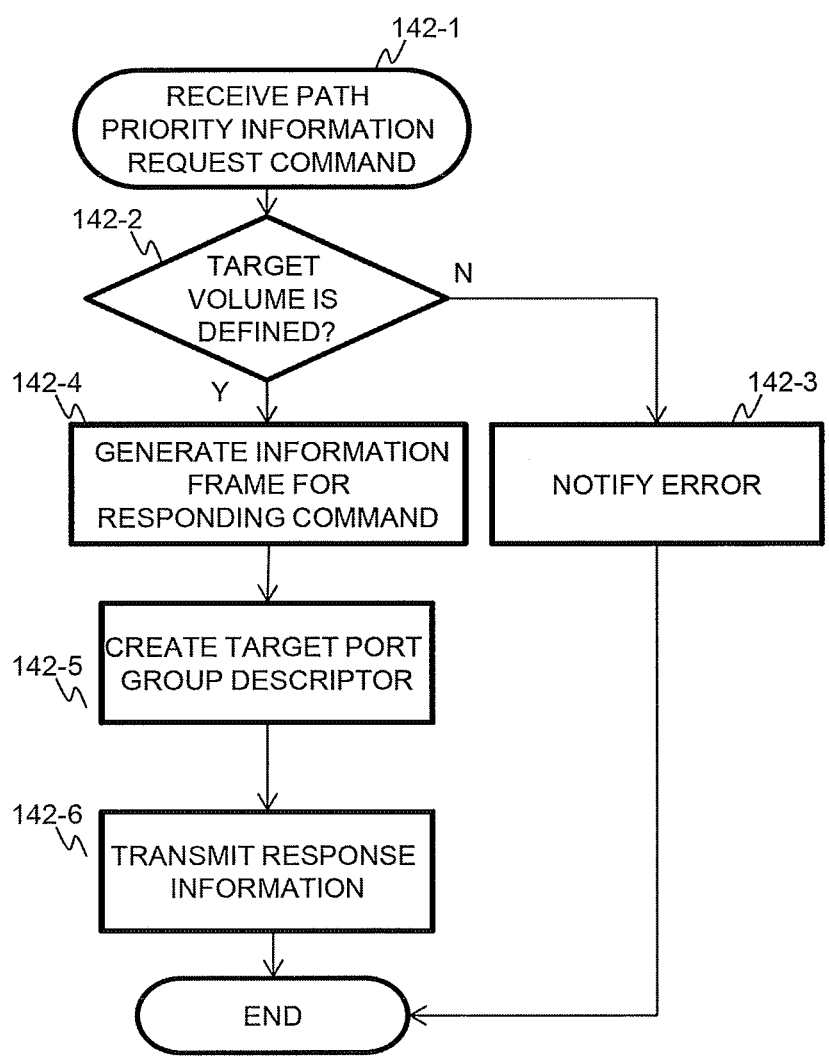
FIG. 14 is a process flow of a priority path notification program according to Embodiment 1.

Next, with reference to FIG. 14, the flow of the process executed by the priority path notification program (142) will be described. The priority path notification program (142) is executed when the REPORT TARGET PORT GROUPS command is received from the host computer 300.

When the REPORT TARGET PORT GROUPS command is received from the host computer 300 (step 141-1), the MP 111 determines whether a volume designated by the command (hereinafter, this volume is called "target volume") exists or not (step 142-2). This determination is similar to the determination performed in step 141-2. When it is determined that the target volume does not exist (step 142-2: N), it reports an error to the host computer 300 (step 142-3), and ends the process.

When it is determined that the target volume exists (step 142-2: Y), the processes of step 142-4 and thereafter will be performed. In step 142-4, the MP 111 creates information to be responded to the host computer 300. According to the storage subsystem 100 of Embodiment 1, a format of response information of the REPORT TARGET PORT GROUPS command prescribed by SCSI is used as the format of response information. However, the format of the response information is not restricted thereto.

The format of response information is shown in FIG. 15. The response information is an enumeration of information of multiple target port groups defined for a target volume. The data length of the response information is stored in a four-byte area from the beginning (field F142-0). From the ninth byte from the beginning ("Byte8" in the drawing) and thereafter, which are the areas of fields F142-1a through F142-1n, target port group descriptors, which are information of the respective target port groups, are stored. The other information is not directly related to the present invention, so that the descriptions thereof are omitted. In step 142-4, the area excluding the target port group descriptors (F142-1a through F142-1n) from the response information described in FIG. 15 is created.

Figure 16:
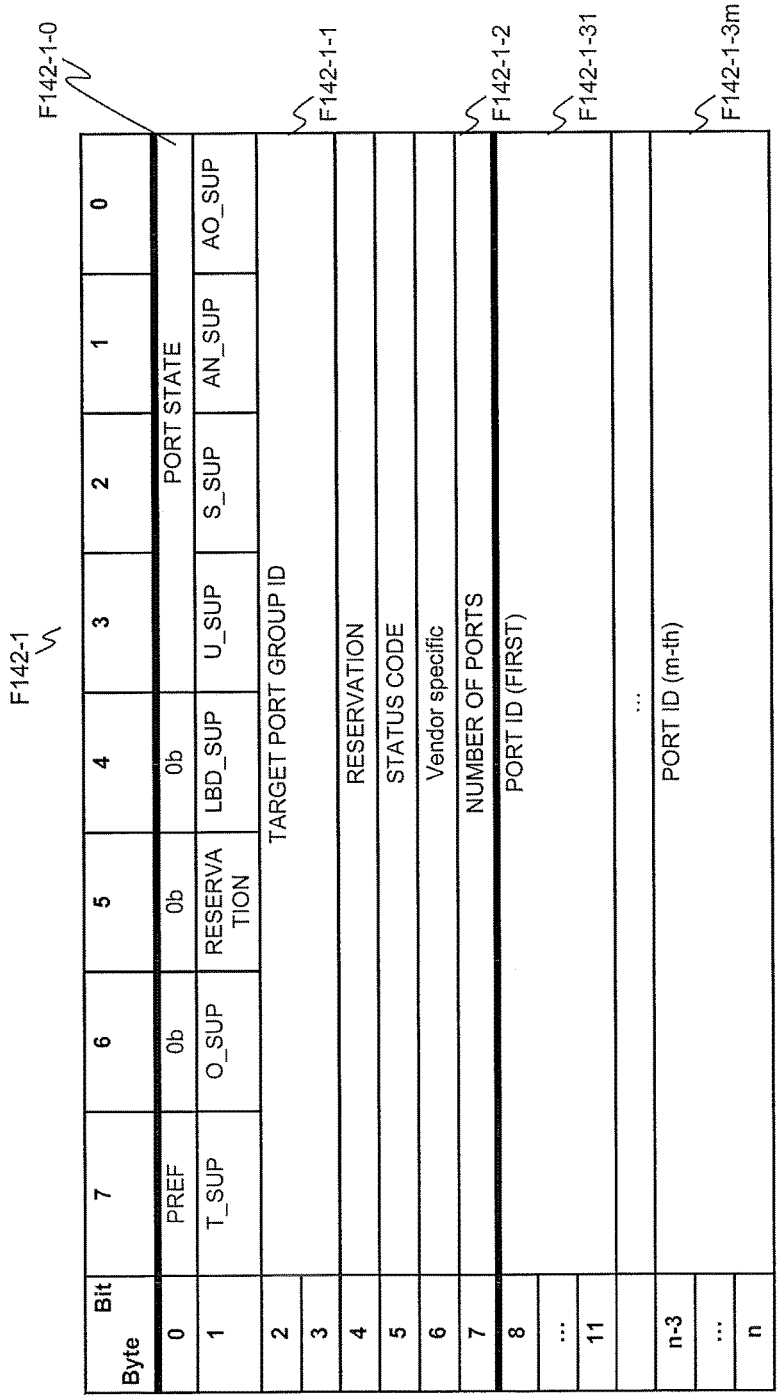
FIG. 16 shows one example of format of response information to a REPORT TARGET PORT GROUPS.

The contents of the target port group descriptor will be described with reference to FIG. 16. A state of the port (such as the Active/optimized, Active/non-optimized and the like mentioned earlier) belonging to the relevant target port group is stored as the target port group descriptor to the lower four bits of the first byte (field F142-1-0). Specifically, in the field F142-1-0:

if 0 is stored, it means that the state of the port is Active/optimized;

if 1 is stored, it means that the state of the port is Active/non-optimized;

if 2 is stored, it means that the state of the port is Standby: and if E (hexadecimal number) is stored, it means that the state of the port is Offline. As mentioned earlier, the ports belonging to the same target port group all have the same port states. Therefore, there is only one type of information of the port state stored in the target port group information (target port group descriptor).

Further, the target port group ID of the target port group is stored in the area of the third and fourth bytes from the beginning of the target port group descriptor (F142-1-1), and the number of ports belonging to the relevant target port group is stored in the eighth byte area (F142-1-2) from the beginning.

Further, the port ID of the port belonging to the relevant target port group is stored in the areas of the ninth and subsequent bytes from the beginning of the target port group descriptor (fields F142-1-31 through F142-1-3m). If there are multiple ports belonging to the target port group, multiple port IDs are stored therein. Other information is not directly related to the present invention, so detailed description is omitted.

Thereafter, the MP 111 creates the target port group descriptor according to the format of the target port group descriptor described above (step 142-5). Specifically, by referring to the port management information 135, the MP 111 can acquire the target port group ID and the port ID of the target port group to which the port whose port state is Active/optimized belongs, the target port group ID and the port ID of the target port group to which the port whose port state is Active/non-optimized belongs, the target port group ID and the port ID of the target port group to which the port whose port state is Standby belongs, and the target port group ID and the port ID of the target port group to which the port whose port state is Offline belongs, so that the target port group descriptor can be created by using this information.

Finally, the MP 111 returns the created response information to the host computer 300 (step 142-10), and ends the process.

One of the timings in which the host computer 300 issues the REPORT TARGET PORT GROUPS command to the storage subsystem 100 is when the host computer 300 is started. Further, it is possible to have the host computer 300 issue the REPORT TARGET PORT GROUPS command periodically to the storage subsystem 100.

Other than that, it is preferable fort the host computer 300 to issue a REPORT TARGET PORT GROUPS command to the storage subsystem 100 when the owner of the volume is changed in the storage subsystem 100. The reason for this is because the change of control package 110 being the owner of the volume is equivalent to the change of port state.

Therefore, when the owner is changed, the storage subsystem 100 notifies that the state of the target port group is changed to the host computer. When the host computer 300 receives this notice, it issues a REPORT TARGET PORT GROUPS command to the storage subsystem 100.

Various known methods can be adopted as the method for notifying that the state of the target port group has been changed to the host computer. As an example, a method for acquiring the error or event information illustrated below defined by SCSI standards can be used.

When the owner is changed, the storage subsystem 100 creates a sense data stating that the UNIT ATTENTION CONDITION has been generated as SCSI sense data to be returned to the host computer 300, and returns the same to the host computer 300. Normally, when the host computer 300 receives this sense data, it operates to acquire detailed information (in this case, information that the state of the target port group has been changed) by issuing the REQUEST SENSE command. The detailed information includes information stating that the state of the target port group has been changed, so that the host computer 300 can detect that the state of the target port group has been changed.

Figure 17:
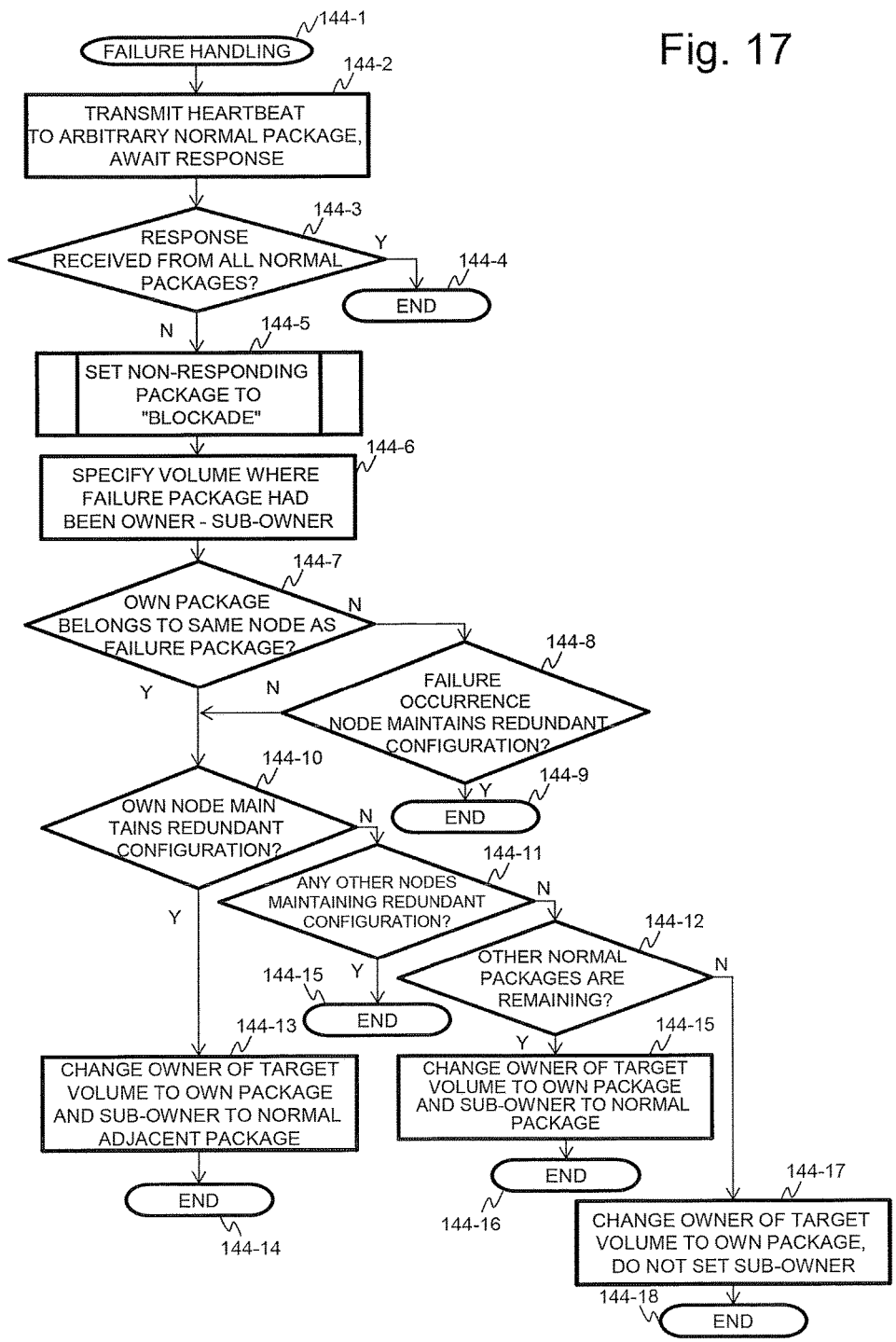
FIG. 17 is a process flow of a failure handling program.

Next, the flow of the process executed by the failure handling program (144) will be described with reference to FIG. 17. As mentioned earlier, the failure handling program (144) is a program being executed periodically (such as per second or per minute). Further, when a heartbeat message is transmitted from the failure handling program (144) being executed in another control package 110, a process to respond to the same is also performed.

When the failure handling program (144) is started, the MP 111 refers to the cluster configuration management information 131, transmits a heartbeat message to all the control packages 110 whose state (131-3) is "normal", and waits for a response to be received from each control package 110 for a predetermined time (step 144-2). When the failure handling program (144) executed in other control packages 110 receives the heartbeat message, it returns a response message to the transmission source control packages 110 of the heartbeat message.

When there are responses from all the control packages 110 having transmitted the heartbeat message (step 144-3: Y), the MP 111 ends the process. When a control package 110 that did not respond to the heartbeat message exists (step 144-3: Y), the MP 111 executes the processes of steps 144-5 and thereafter. In step 144-5, the MP 111 sets the state (131-3) in the cluster configuration management information 131 to "blockade" for the control package 110 that did not respond. In the following description, the control package 110 that did not respond to the heartbeat message is called a "failure package".

Next, in step 144-6, the MP 111 refers to the volume management information 132, and specifies the volume whose owner is the failure package. Hereafter, the volume specified here is called a "target volume".

In step 144-7, the MP 111 determines whether the control package 110 to which it belongs (exists) (which is called an "own package") and the failure package belong to the same node or not. If they do not belong to the same node (step 144-7: N), the MP 111 determines whether the node to which the failure package belongs (in FIG. 17, this node is denoted as a "failure occurrence node") maintains a redundant configuration or not (that is, whether two or more normal control packages 110 exist in the failure occurrence node or not) (step 144-8). If the failure occurrence node maintains the redundant configuration (step 144-8: Y), the MP 111 returns the state (131-3) of the cluster configuration management information 131 set to "blockade" in step 144-5 back to "normal", and ends the process of the failure handling program (144) (step 144-9).

If it is determined in step 144-7 that the own package and the failure package belong to the same node (step 144-7: Y), the MP 111 executes the processes of step 144-10 and thereafter. In step 144-10, the MP 111 determines whether the node to which it belongs maintains a redundant configuration or not, and if the node to which it belongs maintains a redundant configuration, it executes step 144-13. In step 144-13, the MP 111 updates the contents of the volume management information 132 to set the own package to be the owner of the target volume, and the normal (not in blockade state) control package 110 out of the adjacent packages of the own package to be the sub-owner of the target volume, and ends the process.

In step 144-10, when the node to which it belongs does not maintain the redundant configuration, the determination of step 144-11 is performed. In step 144-11, the MP 111 determines whether there is a node maintaining the redundant configuration other than the node to which it belongs, and if there is (step 144-11: Y), the MP 111 returns the state (131-3) of the cluster configuration management information 131 set to "blockade" in step 144-5 to "normal" again, and ends the process of the failure handling program (144) (step 144-15). When there is no node maintaining the redundant configuration (step 144-11: N), the determination of step 144-12 is performed.

In step 144-12, the MP 111 determines whether there exists a control package 110 where the state is normal other than the own package. If there exists a control package 110 whose state is normal (step 144-12: Y), the MP 111 updates the contents of the volume management information 132 so that the own package is set as the owner of the target volume, and the normal control package 110 other than the own package is set as the sub-owner of the target volume, and ends the process. When multiple normal control packages 110 other than the own package exist, it is possible to set any one of the multiple normal control packages 110 as the sub-owner of the target volume.

On the other hand, if a control package 110 whose state is normal does not exist (step 144-12: N), the MP 111 updates the contents of the volume management information 132 so that the own package is set as the owner of the target volume, and then ends the process. At this time, the sub-owner of the target volume is not set (an invalid value is stored in the sub-owner ID (132-6) of the volume management information 132).

It seems as if the change of owner of the target volume is not performed when the determinations of step 144-8 and step 144-11 are affirmative. However, actually, since the failure handling program (144) is executed in all other control packages 110, when the failure handling program (144) is executed in the other control packages 110 (and the node to which the relevant control package 110 belongs adopts a redundant configuration), the MP 111 of the other control packages 110 performs change the owner-sub-owner. The process of FIG. 17 illustrates one example, and it is not always necessary for the owner to be changed according to the process flow of FIG. 17. It is possible to adopt a process where the control package 110 having detected the failure always changes the owner of the target volume.

Figure 18:
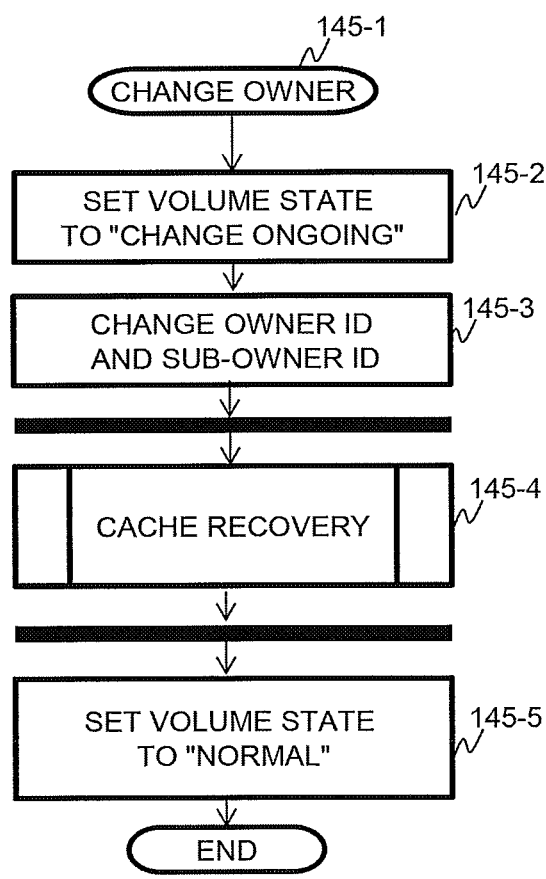
FIG. 18 is a process flow of an owner change program.

Next, the flow of the process performed by the owner change program (145) will be described with reference to FIG. 18. The owner change program (145) is executed by being called by the volume I/O program (141) and the failure handling program (144). When calling the owner change program (145), the call source program such as the volume I/O program (141) or the failure handling program (144) designates the volume ID of the volume being the owner change target, the owner ID, and the sub-owner ID after change as parameters.

In step 145-2, the MP 111 sets the content of state 132-2 to "change-ongoing" for the row (hereinafter called a "target row") in the volume management information 132 where the volume ID (132-1) is equal to the volume ID of the designated owner change target volume. Thereafter, the MP 111 sets the owner ID and the sub-owner ID designated as parameters to the owner ID (132-5) and the sub-owner ID (132-6) of the target row (step 145-3).

Simultaneously in step 145-3, the MP 111 updates the port group and port information (entries 135-11 through 135-42) of the row where the volume ID (135-0) of the port management information 135 is equal to the volume ID of the designated owner change target volume. Specifically, the MP 111 refers to the volume management information 132 and the cluster configuration management information 131, stores the port ID and the port group ID of the port of the control package 110 being the owner of the owner change target volume to port Active/opt (135-12) and port group Active/opt (135-11), respectively, and stores the port ID and the port group ID of the control package 110 being the sub-owner of the owner change target volume to port Active/nonopt (135-22) and port group Active/nonopt (135-21), respectively. Further, out of the control packages not being the owner or the sub-owner of the owner change target volume, the port IDs and the port group IDs of the ports of the normal control package 110 are stored in the port Standby (135-32) and the port group Active/Standby (135-31), respectively. Even further, out of the control packages not being the owner or the sub-owner of the owner change target volume, the port ID and the port group ID of the port of the control package 110 in blockade state are stored in port Offline (135-42) and port group Active/Offline (135-41), respectively. At this time, the information to be set to a part of the fields of the port management information 135 may not exist. For example, if a control package 110 in a blockade state does not exist, there will be no information to be stored in port group Active/Offline (135-41) and port Offline (135-42). In that case, an invalid value (n/a) is stored in the relevant fields.

In step 145-4, a recovery process of a cache area accompanying the change of owner is performed. The contents of this process will be described later. Lastly, the MP 111 returns the content of the target row state 132-2 to "steady" and ends the process.

We will now describe the recovery process of the cache area accompanying the change of owner performed in step 145-4. When owner change is performed, the cache data of the owner change target volume may be stored in the cache area 134 of the control package 110 being the current owner or the current sub-owner. Especially when the data is a dirty data, if the owner is changed, the dirty data stored in the cache area 134 may not be reflected in the drives 121. When the data is a clean data, if the owner is changed, the clean data remaining in the cache area 134 will not be accessed, and the cache area 134 will be oppressed ineffectively. The recovery process of the cache area is executed when changing the owner of the volume, so as to perform appropriate processes to the cache data of the owner change target volume.

According to the cache area recovery process, processing is performed based on the following ideas.

a) Destaging is performed to the control package having the dirty data of the owner change target volume (control package having been the owner or the sub-owner before owner change). If a control package being the owner of the target volume before owner change exists, the control package having been the owner of the target volume performs destaging, but if the control package having been the owner of the target volume before owner change does not exist (such as when failure has occurred to the control package having been the owner of the target volume), the control package having been the sub-owner of the target volume performs destaging. However, if the control package becoming the owner or the sub-owner of the target volume after the owner change has dirty data (both the control packages being the owner and the sub-owner of the target volume after owner change have been the sub-owner and the owner of the target volume before owner change), there is no need to copy the dirty data.

b) Out of the control packages after owner change, clean data is deleted (freed) from the control packages other than the control package becoming the owner of the target volume.

c) Out of the control packages after owner change, all data is deleted from the control packages not being the owner or the sub-owner of the target volume.

FIG. 19 is a table having summarized the processes to be performed to the cache data of the owner change target volume in the respective control packages 110. Columns 144-3-4 (144-3-41, 144-3-42 and 144-3-43) respectively show the processes to be performed to the cache data of the owner change target volume when the control package 110 is changed to be the owner of the owner change target volume, changed to be the sub-owner of the owner change target volume, and changed to a state where it is neither the owner nor the sub-owner of the owner change target volume.

As shown in FIG. 19, four types of information are stored in the respective fields, which are "destage", "free data", "NOP" and "n/a". "Destage" means that the dirty data being cached should be destaged to the drive 21. "Free data" means that the data being cached should be deleted (freed). "NOP" shows that no processing should be performed to the cache data, and "n/a" shows an improbable state.

Each of the columns 144-3-4 (144-3-41, 144-3-42 and 144-3-43) have nine fields, and each field in row 144-3-11 store processes to be performed when there are no failure packages. Each field in row 144-3-12 store processes to be performed when the package being the owner of the owner change target volume fails. Each field in row 144-3-13 store processes to be performed when the package being the sub-owner of the owner change target volume fails.

The contents of the respective fields will be described taking row 144-3-13 as an example. The processes to be performed when the package being the sub-owner of the owner change target volume fails are stored in the three fields of column 144-3-42 in row 144-3-13. Of these three fields, the field on the uppermost row stores the process to be performed by the control package having been the owner of the owner change target volume before owner change and becoming the sub-owner of the owner change target volume after owner change. Since "destage" and "free data" are stored in this field, the control package 110 corresponding to this field performs destaging of data of the owner change target volume when owner change is performed. The reason of the control package 110 corresponding to this field performing destaging is that the relevant control package 110 corresponds to rule a) mentioned earlier. As described earlier, this process is performed so that the control package 110 being the new sub-owner can access the latest data. If the control package 110 being the owner of the owner change target volume does not perform destaging, and if failure occurs to the control package 110 being the owner and the package stops, the data which had not been destaged cannot be accessed. Destaging is performed so as to prevent the occurrence of such state.

Further, the control package 110 corresponding to this field performs freeing of data of the owner change target volume after destaging, based on rule b) mentioned earlier. Based on rule b), only the clean data should be freed, but since destaging is performed based on rule a) mentioned earlier, all the data of the owner change target volume is set as clean data. Therefore, all the data are freed by freeing the clean data.

The fields on the second row store the processes to be performed by the control package being the sub-owner of the owner change target volume before owner change and after owner change. However, since row 144-3-13 is a row storing the processes to be performed when failure occurs to the package being the sub-owner of the owner change target volume, there is no control package 110 corresponding to the condition of the relevant field. Therefore, "n/a" is stored in the relevant field.

The fields on the third column store the processes to be performed by the control package which had not been the owner or the sub-owner of the owner change target volume before owner change, but set as the sub-owner after owner change. However, the data of the owner change target volume is not cached to the control package which is neither the owner nor the sub-owner of the owner change target volume before owner change, so that there is no process to be performed accompanying the owner change. Therefore, "NOP" is stored in the relevant field.

In the recovery process of the cache area (step 145-4), processes based on the contents stored in the respective fields of FIG. 19 are performed to the cache data of the owner change target volume cached to the cache area 134 of the respective control packages 110.

As mentioned, according to the storage subsystem of Embodiment 1, an appropriate control package can be selected as the owner of the logical volume according to the area where failure has occurred to the computer system, and after owner change, the port state (priority) of the control package is notified to the host computer, so that the host computer can recognize the appropriate control package being the access request issue destination. Further, when selecting the control package being the owner of the logical volume, the node having the redundant configuration can be set as the owner of the logical volume with priority, so that overhead when performing duplex writing of write data to the cache area will not be increased compared to that before owner change. Therefore, even when owner change of logical volume accompanying the occurrence of failure occurs, the access performance will not be deteriorated.

Embodiment 2

Next, Embodiment 2 of the present invention will be described. The configuration of the computer system according to Embodiment 2 is the same as the computer system described in Embodiment 1, so that it will not be described here. Further, the configuration of the storage subsystem according to Embodiment 2, and the types of the various information and programs stored in the memory 112 of the storage subsystem are also the same as those of the storage subsystem 100 described in Embodiment 1.

As mentioned earlier, according to the storage subsystem 100 of Embodiment 1, the owner of the volume or the port state are changed appropriately according to the failure occurrence location, so that the access performance to the volume is not deteriorated. The storage subsystem 100 according to Embodiment 2 has similar characteristics as the storage subsystem 100 of Embodiment 1, and can correspond to a wider range of failures.

One of the drawbacks according to the storage subsystem 100 of Embodiment 1 is the point that it is difficult to cope with problems when failure in node units occurs. This will be described with reference to FIG. 1. We will assume a case where a failure occurs by which a certain one of the nodes of the storage subsystem 100, for example, the whole of node 130*p*, stops, or a case where all the access paths to the node 130*p* have been disconnected. In this case, the remaining accessible control packages 110 are the control packages 110*c* and 110*d* in node 130*q*, but the host computer 300 recognizes that the port states of both the ports of control packages 110*c* and 110*d* defined for the volume 122*x* are both "Standby". Therefore, when it is not possible to access the control packages 110*a* and 110*b*, the host computer 300 will not switch the access destination to the control packages 110*c* and 110*d*, so that the I/O processing stops.

According to the storage subsystem 100 of Embodiment 2, the I/O processing will not be stopped even when failure in node units occurs.

The storage subsystem 100 according to Embodiment 2 is composed to at least have the following four types of port states. Further, (the alternate path management software 310 of) the host computer 300 according to Embodiment 2 is configured to be able to identify at least the following four types of port states.
  a) Active/optimized
  b) Active/non-optimized
  d) Offline
  e) Active/non-preferred The port states of a), b) and d) have the same definitions as those described in Embodiment 1. According to the storage subsystem 100 of Embodiment 2, the port state (Active/non-preferred) of e) is newly included instead of the port state (Standby) of c) described in Embodiment 1.

When the port state is Active/non-preferred, it is possible to receive a read or a write command and to return a normal response thereto (in other words, the state is similar to Active/optimized or Active/non-optimized). However, Active/non-preferred means that the port in the relevant state can be accessed, but access thereto is not preferred (an access request should preferably be issued to a different port in accessible state). In other words, a port (or control package) in Active/non-preferred state is a port (control package) having a third highest access priority, subsequent to the port in Active/optimized state and the port in Active/non-optimized state.

Therefore, if the alternate path management software 310 is accessible to the port in other states (Active/optimized or Active/non-optimized state), access to the port where the port state is Active/non-preferred will not be performed. Only when there are no more ports in Active/optimized or Active/non-optimized state, access is performed to the port in Active/non-preferred state.

The above description had described an example where the storage subsystem 100 according to Embodiment 2 has a new port state e) instead of port state c) described in Embodiment 1, but the storage system can also have port state e) in addition to port state c).

Figure 20:
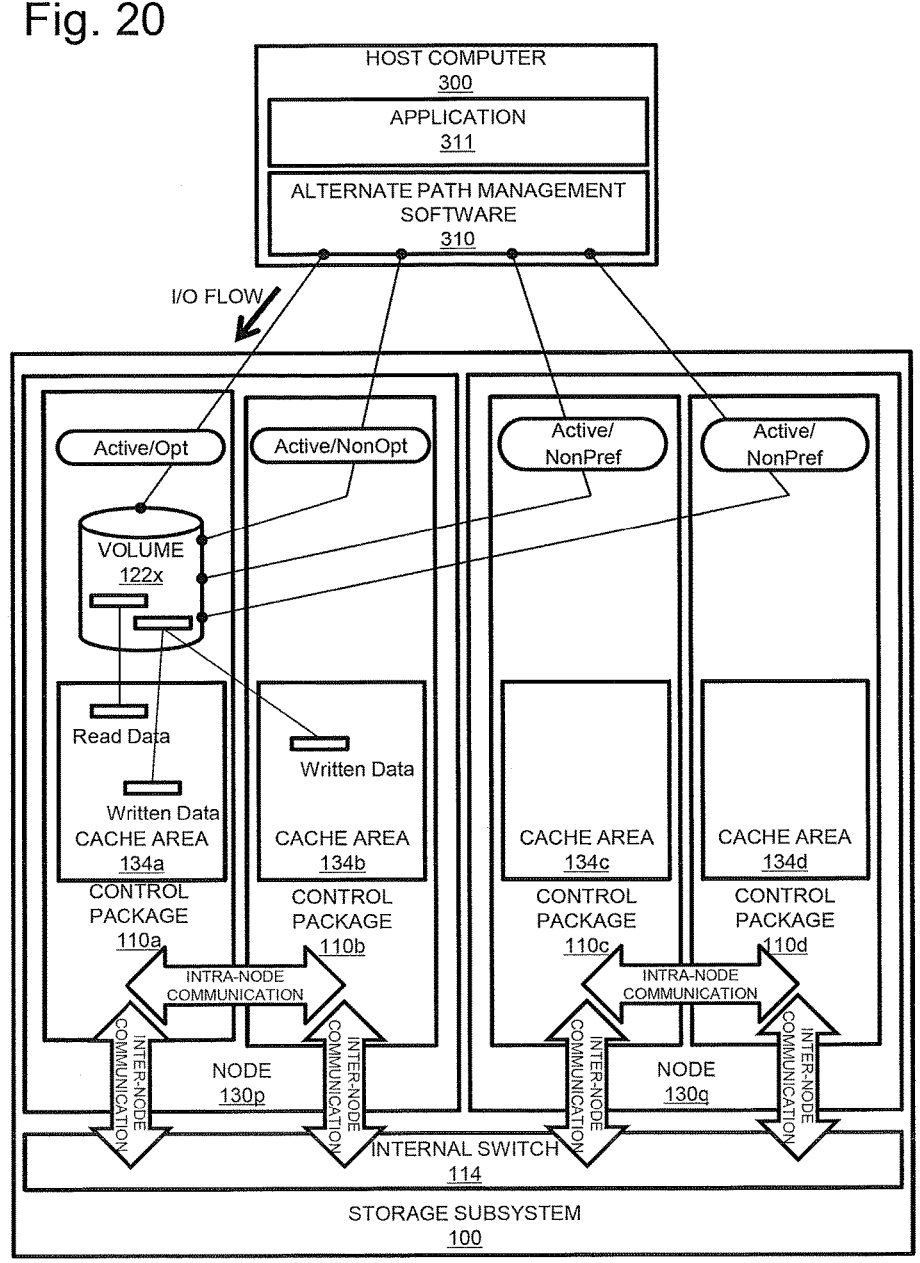
FIG. 20 is a view showing an outline of a process performed in a computer system according to Embodiment 2.

With reference to FIG. 20, the outline of the processes performed in the storage subsystem 100 according to Embodiment 2 will be described. When the control package 110*a* is the owner of volume 122*x* and the control package 110*b* is the sub-owner thereof, the port state of the control package 110*a* is Active/optimized and the port state of the control package 110*b* is Active/non-optimized. According further to the storage subsystem 100 of Embodiment 2, the port states of the control packages 110*c* and 110*d* which are neither the owner nor the sub-owner of volume 122*x* are set to Active/non-preferred.

Thereby, if the host computer 300 cannot access the control packages 110*a* and 110*b*, it issues the access request to the port of the control packages 110*c* or 110*d* where the port state is Active/non-preferred. The access request to the volume 122*x* arriving at the control packages 110*c* or 110*d* is transferred via the inter-node communication path to the owner control package 110*a*, by which the I/O processing is performed.

When failure occurs to the whole node 130*p* and both the control packages 110*a* and 110*b* stop, processing cannot be performed (error is returned) even if the control package 110*c* or 110*d* receives an access request (read request or write request) to the volume 122*x*, until at least the owner of the volume 122*x* is changed. However, in this case, as described in Embodiment 1, the owner of the volume 122*x* is changed to a different control package 110 (in the configuration example of FIG. 20, the control package 110*c* or 110*d*), and I/O requests are processed by the control package 110 after owner change.

As described in Embodiment 1, in that case, a notice stating that the owner had been change can be notified to the host computer 300 via the access path between the host computer 300 and the control package 110c or 110d, and based on this notice, the host computer 300 acquires the information of the owner (port state) after change from the storage subsystem 100, so that the port state of the control packages 110c and 110d can be changed. Thereby, the I/O will not stop even when failure occurs to the node 130p.

Figure 21:
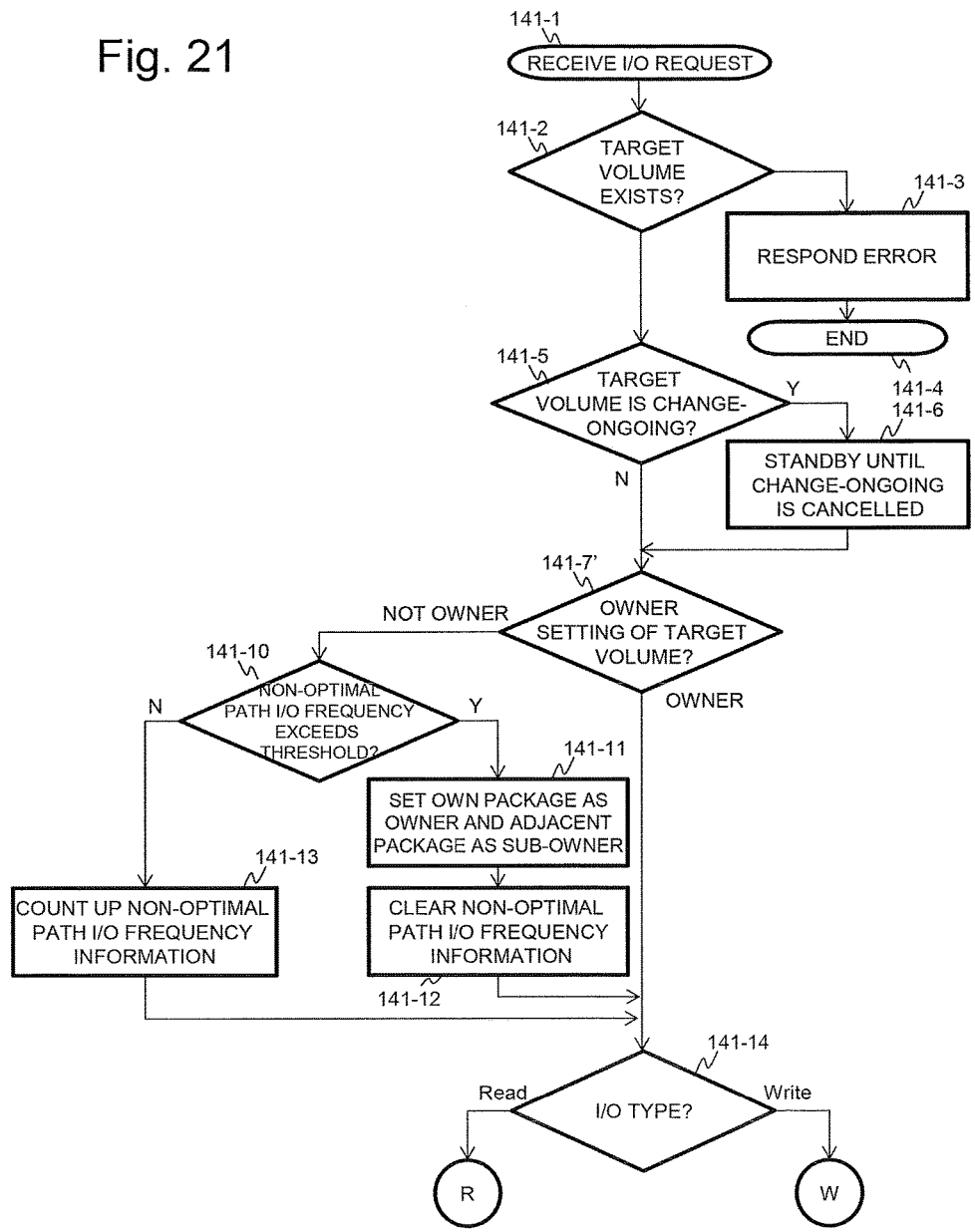
FIG. 21 is a process flow (1) of a volume I/O program according to Embodiment 2.
Figure 22:
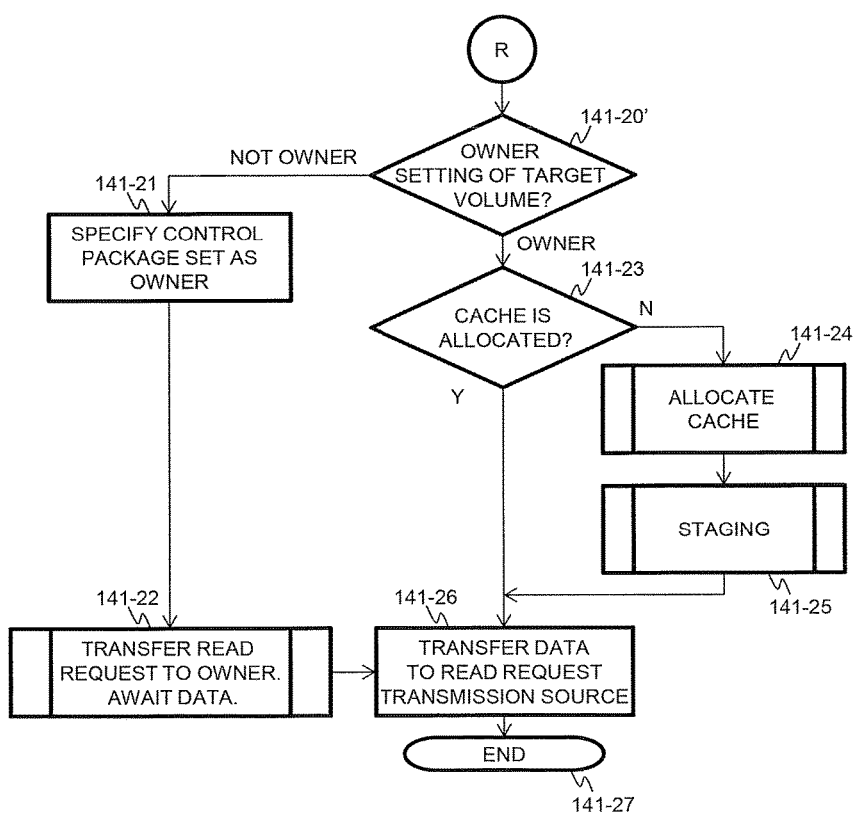
FIG. 22 is a process flow (2) of a volume I/O program according to Embodiment 2.
Figure 23:
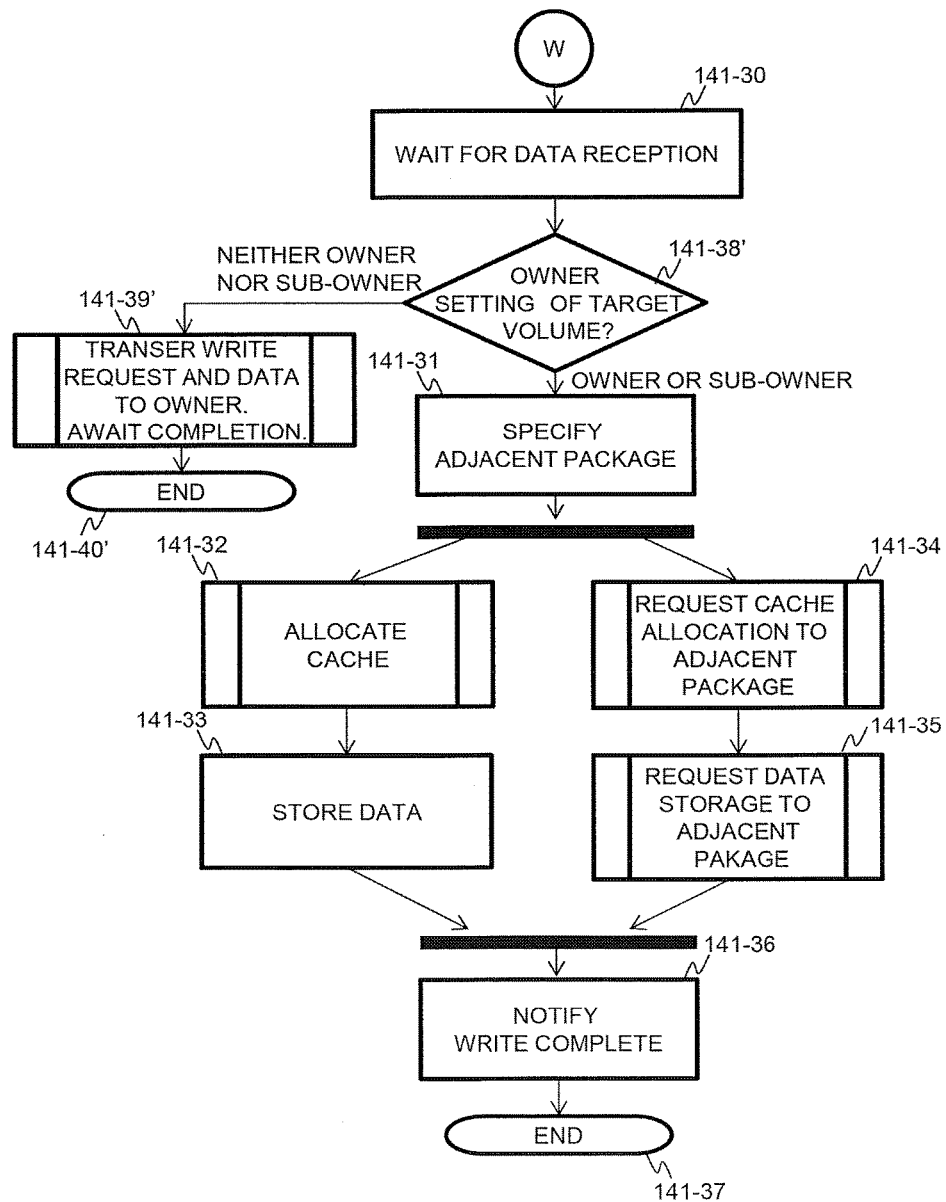
FIG. 23 is a process flow (3) of a volume I/O program according to Embodiment 2.

Next, with reference to FIGS. 21 through 23, the flow of the processes performed by the volume I/O program (141) according to Embodiment 2 will be described. The flow of the processes performed by the volume I/O program (141) according to Embodiment 2 has many common characteristics as the processes performed by the volume I/O program (141) according to Embodiment 1, so that mainly the differences therefrom will be described in the following description.

The processes up to step 141-6 are the same as those of Embodiment 1.

In step 141-7', the MP 111 determines whether the own package is the owner of the access target volume or not (there are also a case where it is a sub-owner, and a case where it is neither the owner nor the sub-owner), and if it is the owner, it executes the processes of steps 141-14 and thereafter. If it is not the owner, it executes the processes of step 141-10 and thereafter. The processes of step 141-10 through step 141-14 are the same as those of Embodiment 1.

In step 141-20', the MP 111 confirms the owner of the target volume, and determines whether the own package is an owner of the access target volume or not. If the own package is an owner of the access target volume, the process of step 141-21 is executed. If the own package is a sub-owner of the access target volume, it executes the process of step 141-23. The processes of step 141-21 through step 141-26 are the same as those of Embodiment 1.

Further, while performing count-up of the frequency information in step 141-13, it is also possible to add weight depending on the selected path, such as by adding 1 when the path passes the port of the sub-owner package and by adding 10 when the path passes the port of a package other than the owner or sub-owner packages.

In step 141-14, when it is determined that the received I/O request is a write command (step 141-14: Y), the processes of step 141-30 and thereafter are executed. The process of step 141-30 is the same as that of Embodiment 1. After step 141-30, the MP 111 executes step 141-38.

In step 141-38', the MP 111 confirms the owner of the target volume, and determines whether the own package is the owner or the sub-owner of the access target volume, or neither the owner nor the sub-owner thereof. If the own package is the owner or the sub-owner of the access target volume, it executes the processes of step 141-31 and thereafter. The processes of step 141-31 and thereafter are the same as those described in Embodiment 1.

In the determination of step 141-38', if it is determined that the own package is neither the owner nor the sub-owner of the access target volume, the MP 111 calls the communication program (146), and transfers the I/O request (write command) having been received to the control package being the owner (step 141-39). Then, it waits for a response from the control package to which the I/O request has been transferred, and when a response is received, ends the process.

Next, regarding the processes executed by the priority path notification program (142) of Embodiment 2, the differences from the processes described in Embodiment 1 will be described. According to the priority path notification program (142) of Embodiment 2, out of the control packages neither being the owner nor the sub-owner, only the normal control package whose port state is Active/non-preferred is returned, which differs from the priority path notification program described in Embodiment 1. There are no other differences. Further, the port management information of Embodiment 1 had the port Standby (135-32) field and the port group Active/Standby (135-31) field, but according to the port management information of Embodiment 2, a port Active/non-preferred field and a port group Active/non-preferred field are provided instead. The other points are the same as the port management information described in Embodiment 1, so that it will not be illustrated in the drawings.

Next, the process performed by the owner change program (145) according to Embodiment 2 will be described, focusing on the differences from that described in Embodiment 1. According to the owner change program (145) of Embodiment 1, in step 145-3, the port ID and the port group ID of the port of a normal control package 110 out of the control packages 110 which are neither the owner nor the sub-owner of the owner change target volume are respectively stored in the port Standby (135-32) and the port group Active/Standby (135-31). In Embodiment 2, this process is changed to the process of respectively storing the port ID and the port group ID of the port of a normal control package 110 out of the control packages 110 which are neither the owner nor the sub-owner of the owner change target volume to a port Active/Standby field and a port group Active/Standby field of the port management table. The other processes are the same.

Further, the flow of the processes performed by the failure handling program (144) is the same as those described in Embodiment 1, so the details thereof are not illustrated.

The storage subsystem 100 according to Embodiment 2 has similar characteristics as the storage subsystem 100 of Embodiment 1, and is capable of continuing operation even when failure occurs to the whole node.

Embodiment 3

Next, we will describe Embodiment 3. The configuration of the computer system, or the types of the programs and management information that the storage subsystem 100 has according to Embodiment 3 are the same as those described in Embodiment 1 or 2.

According to the storage subsystem of Embodiments 1 or 2, the dirty data is destaged from the control package being the owner or the sub-owner of the volume during the recovery process of the cache area accompanying the change of owner, to thereby prevent the control package after owner change from reading inconsistent data. On the other hand, according to the storage subsystem of Embodiment 3, the control package which is the owner or the sub-owner of the volume transfers the cache data via the intra-node communication path or the inter-node communication path to the control package becoming the owner or the sub-owner of the volume after owner change during the recovery process of the cache area accompanying owner change, to have the cache data stored in the cache area of the control package becoming the owner or the sub-owner of the volume after owner change.

The process performed by the storage subsystem according to Embodiment 3 is the same as that described in Embodiment 1 or Embodiment 2, except for the recovery process of the cache area (step 145-4) described in Embodiment 1. In the following description, only the recovery process of the cache area performed in the storage subsystem according to Embodiment 3 will be described.

FIG. 24 is a table having summarized the processes to be performed to the cache data of the owner change target volume in the respective control packages 110 according to Embodiment 3. The differences between Embodiment 1 (FIG. 19) will mainly be described. The major difference is that the area where destaging had been performed in Embodiment 1 (FIG. 19) is changed to copying of data to a new owner and/or a new sub-owner in Embodiment 3.

The processes performed by the respective control packages 110 in Embodiment 3 are based on the following ideas (rules).

1) The control package having the dirty data of the owner change target volume performs copying of dirty data to the control package which will become the owner or the sub-owner of the owner change target volume after owner change. However, if the control package after owner change clearly has the dirty data (if the control package after owner change had been the owner or the sub-owner of the target volume before owner change), there is no need to copy the dirty data.

2) If the control package has the clean data of the owner change target volume, it will copy the clean data to the control package which will become the owner of the owner change target volume after owner change.

3) Out of the control packages after owner change, clean data will be deleted from the control packages other than the control package becoming the owner of the owner change target volume.

4) Out of the control packages after owner change, all data will be deleted from the control packages which are neither the owner nor the sub-owner of the owner change target volume.

The above-described rules 3) and 4) are the same rules as rules b) and c) described in Embodiment 1. The rules 1) and 2) described above are new rules according to Embodiment 3. According to these rules 1) and 2), dirty data will be copied to the control package becoming the owner or the sub-owner of the owner change target volume after owner change, and clean data will be copied to the control package becoming the owner of the owner change target volume after owner change.

The storage subsystem according to Embodiment 3 has been described. In the storage subsystem according to Embodiment 1 or Embodiment 2, the control package after owner change is prevented from reading inconsistent data, by having the dirty data destaged from the control package being the owner or the sub-owner of the volume during the recovery process of the cache area accompanying owner change. As a result, the control package after owner change must read the data having been stored in the cache area before owner change by accessing the drives, so that there is a drawback that the access performance is deteriorated.

According to the storage subsystem of Embodiment 3, in the recovery process of the cache area accompanying owner change, the control package being the owner or the sub-owner of the volume transfers the cache data via the intra-node communication path or the inter-node communication path to the control package which will become the owner or the sub-owner of the volume after owner change, so as to have the cache data stored in the cache area of the control package which will become the owner or the sub-owner of the volume after owner change. Thereby, the control package which will become the owner or the sub-owner of the volume after owner change will not read inconsistent data, and it will not be required to read data from the drives, so that the access performance is improved.

The preferred embodiments of the present invention have been described, but these embodiments are mere examples for illustrating the present invention, and they are not intended to limit the scope of the present invention to the embodiments illustrated above. The present invention can be carried out in various other forms.

For example, in the preferred embodiments described above, the storage subsystem stores the port state information and the target port group ID information determined for each volume in the port management information 135 and manages the same, and each time the owner of the volume is changed, the information of the port state stored in the port management information 135 is updated. Then, when the storage subsystem receives the REPORT TARGET PORT GROUPS command from the host computer, it creates response information based on the information stored in the port management information 135, and returns the response information to the host computer. However, the present invention is not restricted to the form of managing the states of the respective ports by the port management information 135.

As described above, a relationship is realized where the state of the port of the control package being the owner of the volume is Active/optimized and the state of the port of the control package being the sub-owner of the volume is Active/non-optimized, and the state of the port of the normal control package out of the control packages which are neither owner nor sub-owner of the volume is Standby (or Active/non-preferred). That is, the state of each port can be determined uniquely if the information regarding the state of the control package (whether it is normal or during blockade) and the information of the control package which are the owner or the sub-owner of the volume are recognized.

Therefore, it is also possible for the storage subsystem not to manage the port management information 135, and to perform a process to create and return a response information based on the contents stored in the cluster configuration management information 131 and the volume management information 132 at the point of time when the storage subsystem receives the REPORT TARGET PORT GROUPS command from the host computer.

The configuration of the storage subsystem is not restricted to the configuration described in the above embodiments. For example, according to the storage subsystem of Embodiment 2 described above, it is possible to adopt a configuration where two shared cache areas accessible from the respective control packages in the node are disposed in each node, and to have each node store the write data in the two shared cache areas.

The components described as programs in the preferred embodiments can be realized by hardware using a hard-wired logic and the like. Further, it is possible to adopt a configuration where the respective programs in the preferred embodiment can be stored in storage media such as CD-ROMs and DVDs.

REFERENCE SIGNS LIST

100: Storage subsystem
110: Control package
111: MP
112: Memory
113 Channel control unit
114: Drive control unit
115: Communication control unit 116: Internal switch
121: Drive
125: Backend network
200: Switch
300: Host computer
301: MP
302: Memory
303: HBA

The invention claimed is:

1. A storage subsystem comprising:
a plurality of control nodes for processing requests from a host computer, wherein the plurality of control nodes includes a first control node and a second control node;
a plurality of control packages that each have a priority determined for issuing an access request from the host computer, wherein each of the plurality of control packages include a processor, a memory, and a port for receiving accesses from the host computer;
a first subset of the plurality of control packages that includes respective control packages that are mutually interconnected within the first control node via a respective first communication path;
a second subset of the plurality of control packages, wherein the second subset includes respective control packages that are mutually interconnected within the second control node via a respective first communication path,
a second communication path that interconnects the first subset with the second subset wherein the second communication path has a lower performance than each respective first communication path;
a plurality of storage volumes that are communicatively coupled to the plurality of control packages, wherein the host computer accesses the plurality of storages volumes via one or more of the plurality of control packages; and
a plurality of owners that are each associated with a respective storage volume from the plurality of storage volumes,
wherein each respective owner is a particular control package from the plurality of control packages that is configured to process an I/O request arriving from the host computer to the respective storage volume;
wherein in response to detection of a failure in the storage subsystem, the storage subsystem:
selects a new owner of a particular volume according to a failure occurrence section, wherein a different owner is selected when the failure in the storage subsystem is detected in the respective owner then when the failure is detected an access path between the host computer and the respective owner,
raises the priority of the new owner to a highest priority, and
notifies the priority having been changed to the host computer.

2. The storage subsystem according to claim 1, wherein
the respective owner is within the first subset, and
the new owner is selected from the second subset when the failure is detected in the respective owner and all other control packages in the first subset are in an error state.

3. The storage subsystem according to claim 1, wherein
the respective owner is within the first subset, and
the new owner is selected from first subset when the failure is detected in the access path.

4. The storage subsystem according to claim 3, wherein the failure is detected in the access path when the plurality of control packages that are not the respective owner of the respective storage volume receive a number access requests for the respective storage volume exceed a given threshold value.

5. The storage subsystem according to claim 1, wherein
the respective owner is within the first subset;
the storage subsystem determines the priority of the respective owner as the highest, the priority of other control packages in the first subset as a second highest, and the priority of the second subset as a third highest;
when the first subset can not receive the access request, the storage subsystem sets the second subset to receive the access request; and
the second subset transfers the access request via the second communication path to the respective owner.

6. The storage subsystem according to claim 1, wherein
a part of an area of the memory in each of the plurality of control packages is configured as a cache area for caching data of the volume; and
when a write request to the volume is received from the host computer, a first control package being the owner of the volume stores a write data in the cache area within the first control package, and causes a second control package determined as a sub-owner having a role to store a replica of the write data to the volume to store the write data in the cache area within the second control package.

7. The storage subsystem according to claim 6, wherein
the respective owner is within the first subset,
and
when the second subset receives a given threshold or more of access requests the storage subsystem:
changes the respective owner to a control package within the second subset;
sets another control package as a sub-owner of the volume; and
destages a dirty data stored in the cache area within the control package within the first subset to the storage volume.

8. The storage subsystem according to claim 6, wherein
the respective owner is within the first subset, and
the new owner is selected from the second subset when multiple normal control packages do not exist in the first subset and
copies a dirty data stored in the cache area within the control package having been the sub-owner of the volume to the cache area within the control package set to become the owner of the volume.

9. The storage subsystem according to claim 6, wherein:
the respective owner is within the first subset, and
when a given threshold value or more access requests from the host computer is received by the second subset, the storage subsystem:
changes the respective owner to a control package from the second subset;
sets another control package from within the first subset as a sub-owner of the volume; and
copies a clean data out of the data corresponding to the volume within the control package of the first subset to the cache area within the control package of the second subset.

10. A computer system comprising:
a host computer;
a storage subsystem having a plurality of control nodes for processing requests from the host computer, wherein the plurality of control nodes includes a first control node and a second control node;

a plurality of control packages each having a processor, a memory, and a port for receiving accesses from the host computer;

a first subset of the plurality of control packages that are mutually interconnected within the first control node via a respective first communication path;

a second subset of the plurality of control packages that are mutually interconnected within the second control node via a respective first communication path;

a second communication path that interconnects the first subset and the second subset the via a second communication path having a lower transmission path capacity than the first communication path; and a plurality of owners that are each associated with a respective storage volume from a plurality of storage volumes, wherein each respective owner is a particular control package from the plurality of control packages that is configured to process an I/O request arriving from the host computer to the respective storage volume;

wherein the host computer accesses one or more of the plurality of storage volumes via any one of at least two or more of the plurality of control packages, and each of the plurality of control packages has a priority determined for issuing an access request from the host computer to the volume, and wherein in response to detection of a failure in the storage subsystem, the storage subsystem:

selects a new owner of a particular volume according to a failure occurrence section, wherein a different owner is selected when the failure in the storage subsystem is detected in the respective owner then when the failure is detected an access path between the host computer and the respective owner, raises the priority of the new owner to a highest priority, and notifies the priority having been changed to the host computer.

11. A storage subsystem comprising:

a plurality of control nodes that are communicatively coupled to each other via a first network, wherein each of the plurality of control nodes include multiple control packages each having a processor, a memory, a first communication interface that communicatively couples a respective control package to other control packages within a respective control node via a first pathway, and a second communication interfaces that communication interface that communicatively couples the respective control node to control nodes outside of the respective control node via a second communication pathway;

a plurality of storage volumes communicatively coupled to the plurality of control nodes via a second network; and a host computer that accesses a particular volume from the plurality of storage volumes via any one of at least two or more control packages out of the multiple control packages, wherein each of the at least two or more control packages has a priority determined for issuing an access request from the host computer to the particular volume, wherein the storage subsystem:

determines an owner of each of the plurality of volumes, wherein the owner is included in a particular control node from the plurality of control nodes and is configured to process an I/O request arriving from the host computer to a respective volume, determines the priority of the owner of the respective volume to be a highest, the priority of a second control package that belongs to the particular control node to be a second highest, and the priority of a third control package belonging to a different control node as the owner of the respective volume to be a third highest, when not all the control packages of the particular control node to which the owner of the respective volume belongs can receive the access request, the storage subsystem sets the third control package to receive the access request to the respective volume from the host computer and the third control package transfers the access request via the second communication path to the owner of the respective volume, detects a failure in the storage subsystem, and in response to detecting the failure:

changes the owner of the respective volume according to a failure occurrence section, changes the priority of the owner of the respective volume to a highest priority, and notifies the host computer that the priority of the owner is changed.

* * * * *